United States Patent [19]

Kusumoto et al.

[11] Patent Number: 5,579,131
[45] Date of Patent: Nov. 26, 1996

[54] COLOR IMAGE READING APPARATUS

[75] Inventors: Keiji Kusumoto, Toyokawa; Shoji Imaizumi, Osaka; Kenichi Muroki, Toyokawa, all of Japan

[73] Assignee: Minolta Camera Kabushiki Kaisha, Osaka, Japan

[21] Appl. No.: 631

[22] Filed: Jan. 5, 1993

[30] Foreign Application Priority Data

| Jan. 8, 1992 | [JP] | Japan | 4-001720 |
| Jan. 14, 1992 | [JP] | Japan | 4-004474 |

[51] Int. Cl.$^6$ .............................. G03F 3/08; G03F 3/10
[52] U.S. Cl. .................... 358/518; 358/524; 358/523; 358/527
[58] Field of Search ................... 358/518, 521, 358/522, 523, 527, 506, 509, 515, 524

[56] References Cited

U.S. PATENT DOCUMENTS

| 4,340,905 | 7/1982 | Balding | 358/80 |
| 4,646,252 | 2/1987 | Terashita | 364/525 |
| 4,694,330 | 9/1987 | Tanaka | 358/27 |
| 4,736,245 | 4/1988 | Seto | 358/76 |
| 4,797,713 | 1/1989 | Terashita | 355/77 |
| 4,829,371 | 5/1989 | Hiramatsu | 358/80 |
| 4,837,635 | 6/1989 | Santos | 358/287 |
| 4,884,102 | 11/1989 | Terashita | 355/77 |
| 4,905,039 | 2/1990 | Terashita | 355/35 |
| 5,012,333 | 4/1991 | Lee | 358/80 |
| 5,017,014 | 5/1991 | Terashita | 356/404 |
| 5,107,332 | 4/1992 | Chan | 358/80 |
| 5,121,159 | 6/1992 | Ujiie | 355/38 |
| 5,170,208 | 12/1992 | Koehler | 355/68 |
| 5,185,673 | 2/1993 | Sobol | 358/296 |
| 5,229,585 | 7/1993 | Lemberger | 235/375 |

*Primary Examiner*—Sandra L. O'Shea
*Assistant Examiner*—John Ning
*Attorney, Agent, or Firm*—Brinks Hofer Gilson & Lione

[57] ABSTRACT

CPU performs correcting process for the difference in sensitivity caused by the difference in the kind of film and exposure condition by setting an amplification value of each video amplifier to which an image data on each color of G, R, and B is inputted wherein the amplification value is set so as to make a maximum value in the maximum and minimum values relative to an output of an image data on a predetermined number of picture elements as a predetermined value, and corrects the contents of each lookup table which is provided for maintaining an amplitude of image reading data on each color of R, G, and B constant so as to obtain predetermined output amplitude by the minimum value.

13 Claims, 28 Drawing Sheets

Fig. 8
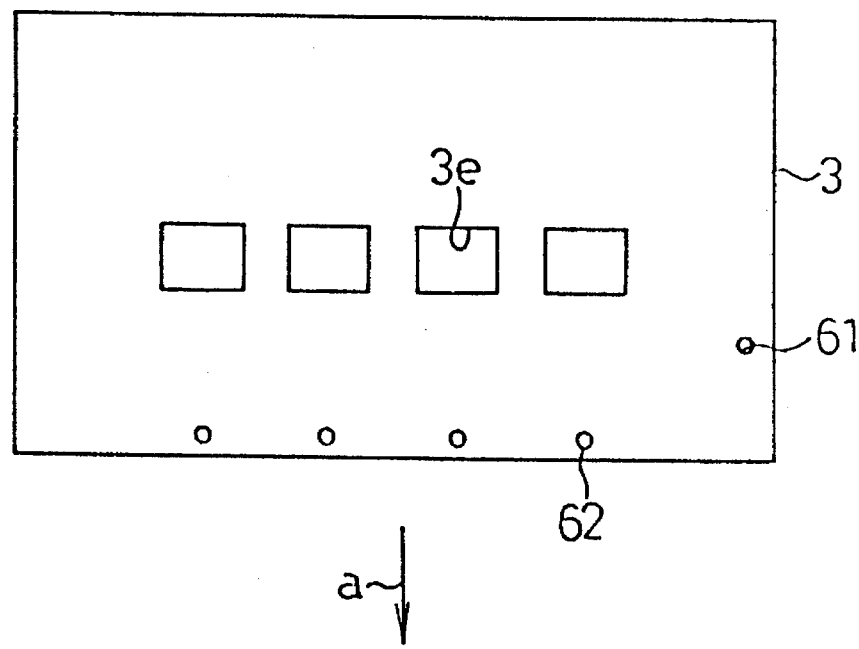
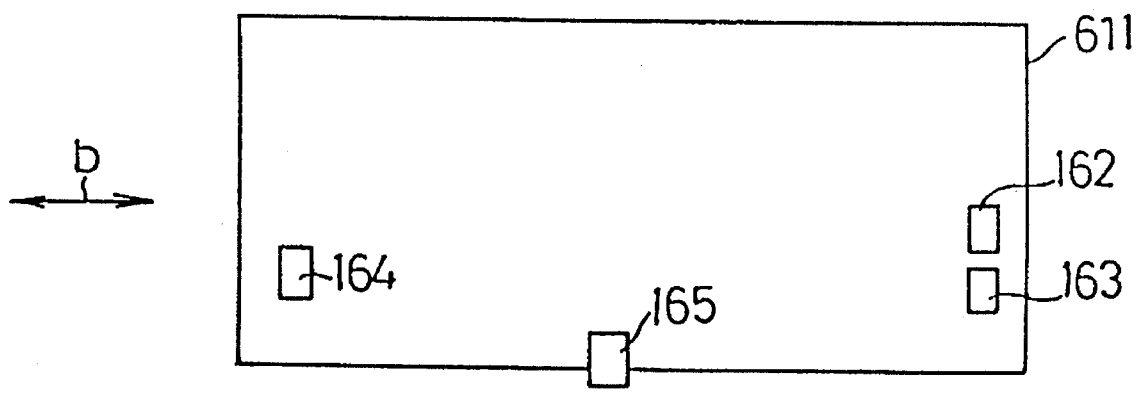

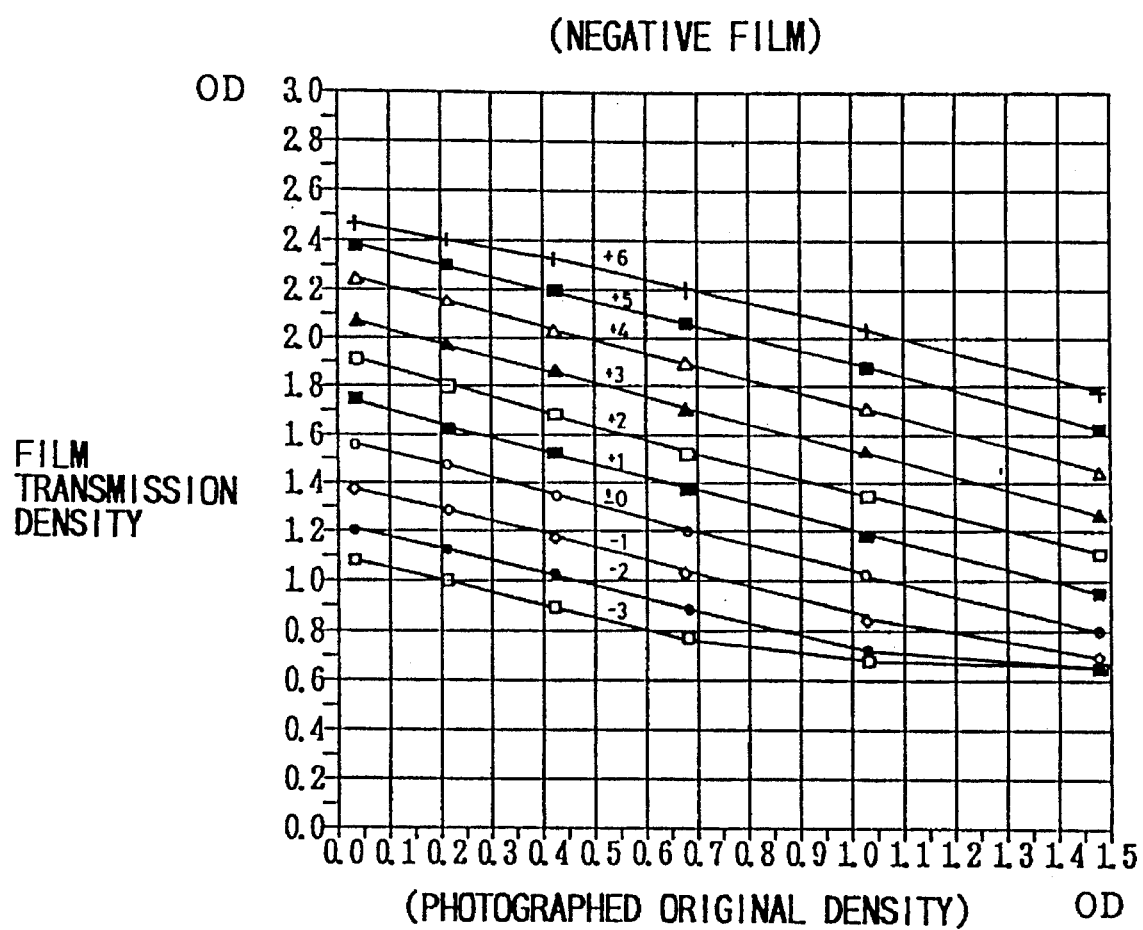

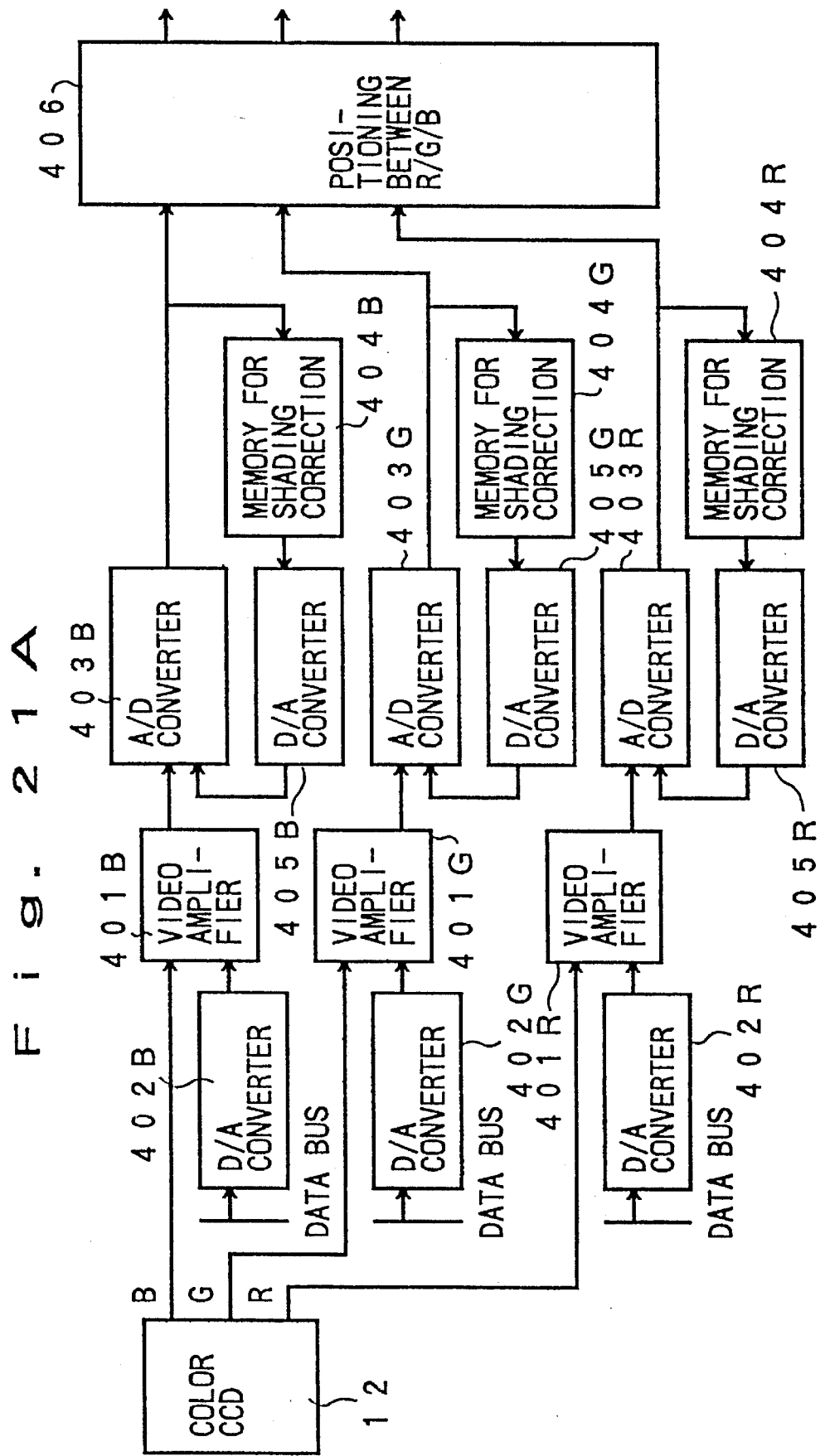

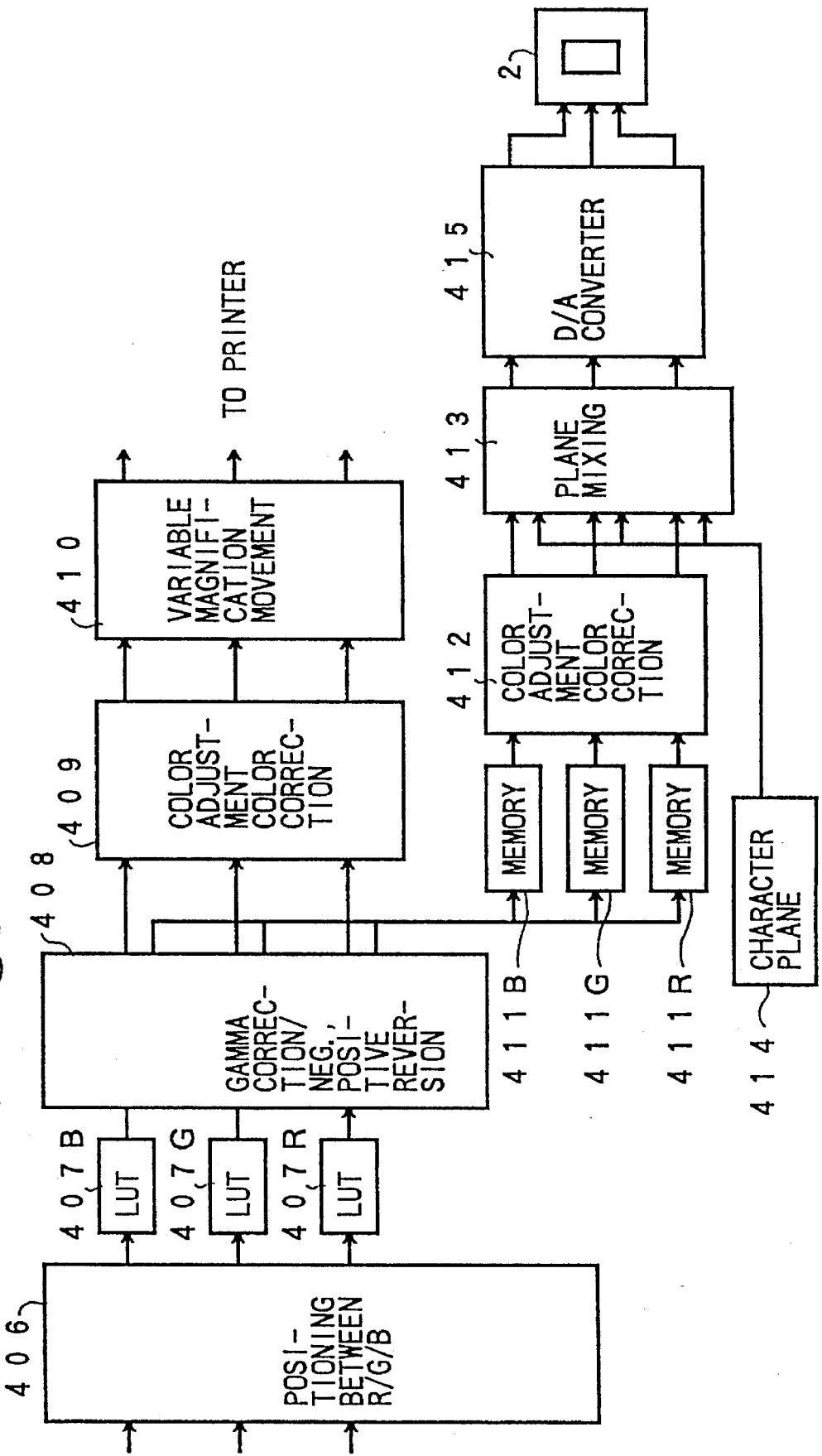

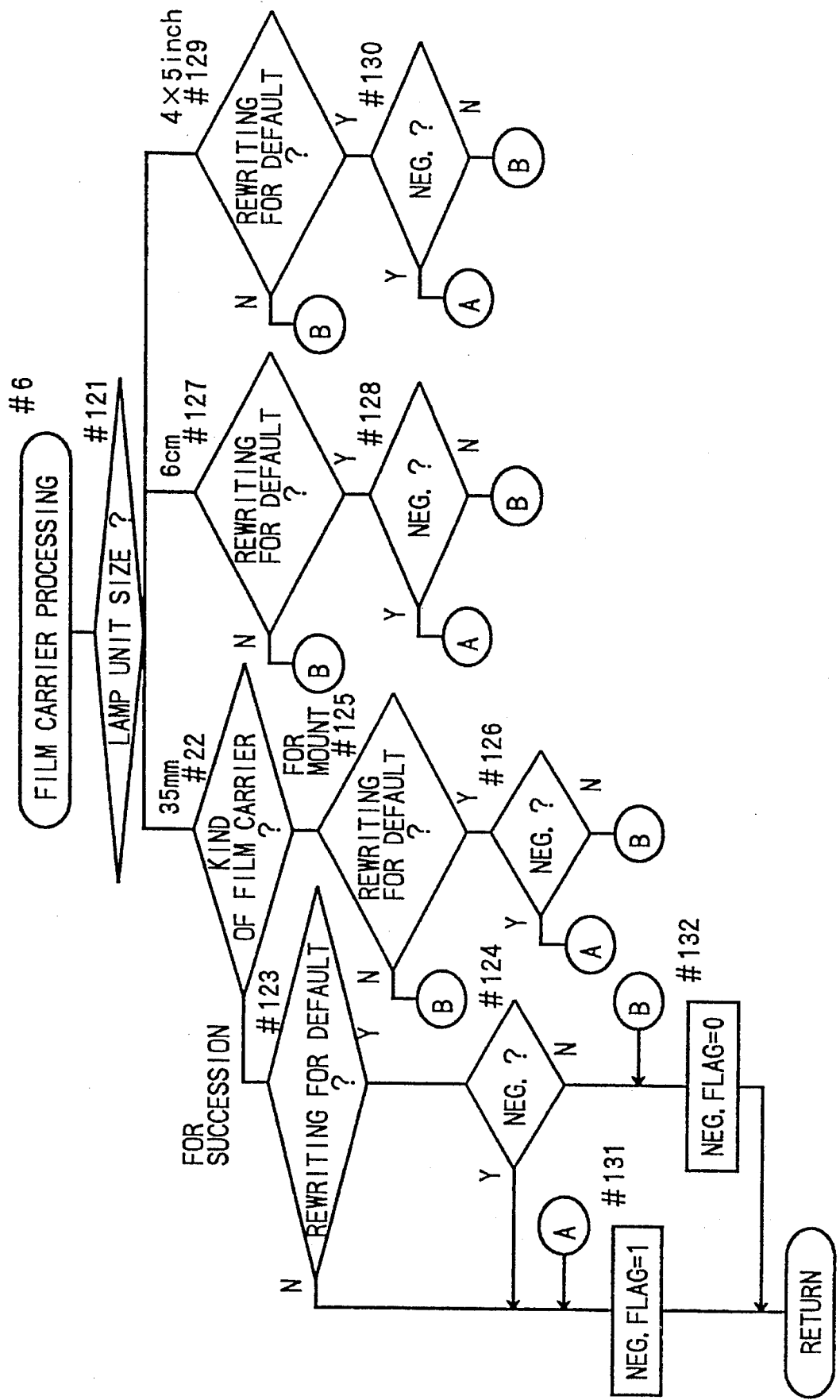

COLOR IMAGE READING APPARATUS

BACKGROUND OF THE INVENTION

1. Technical Field of the Invention

The present invention relates to a color image reading apparatus, and more particularly, to a color image reading apparatus which is adapted to reading a color image of a film and is provided with imaging means for reading a color image formed by an optical system as color separation signal of three colors on each picture element.

2. Description of Related Art

When a color image formed by an optical system is read, there appears characteristic phenomena in color film different from an ordinary reflection type original. For example, even if a color film is used for the same subject to be photographed, transmission density of the film differs depending on an exposure condition under which it is photographed. A balance among lights of red, green and blue (hereinafter called as R, G, B) in a photographed color image differs depending on a kind of film whether it is negative or positive, and depending on a difference in sensitivity.

In Japanese Published Unexamined Patent Application No. 65374/1990, there is disclosed an apparatus which is arranged to correct a data of an image which has been read by the difference between a standard value preliminarily set and a digital image signal which is based on an image read wherein a standard lookup table (hereinafter called as LUT) is provided to correct the difference when a color image is read. However, such a conventional apparatus requires expensive cost for providing circuits since memories for said standard LUT have to be prepared for the number of kinds of films.

When an image reading data is corrected by said LUT corresponding to a kind of film, a kind of film has to be inputted for an image to be read one by one which requires complicated operations, and an apparatus becomes complicated to eventually cause to raise manufacturing cost of the apparatus.

Moreover, if a correction is uniformly conducted by a standard value preliminarily set, even if a scenery photographed has weak contrast, for instance, the contrast becomes stronger since such a uniform correction is performed, and an output a photographer intended can not be displayed. In a film image, when a balance among R, G, and B is broken down like a .scenery of sunset glow, even if a balance of image data among R, G, and B which have been read is uniformly corrected, an output a photographer aimed can not be displayed.

In most cases, special films such as positive film, 4×5-inch film or 6 cm film are used by a specialist. In a photograph taken by a specialist, a balance is intentionally broken and a peculiar exposure condition is set. Therefore, if a correction is uniformly conducted in such a case, an output different from the one the specialist intended is not displayed.

SUMMARY OF THE INVENTION

A primary object of the present invention is to provide a color image reading apparatus wherein a correcting process of an image reading data can be automatically accomplished corresponding to a kind of film whether it is negative or positive, and depending on a film sensitivity without resorting to any special input processing.

Another object of the present invention is to provide a color image reading apparatus which is arranged not to uniformly correct an image reading data of a special image such as an image which posses weak contrast like a scenery of sunset glow where a balance among R, G, and B is broken down without resorting to any special input processing.

A further object of the present invention is to provide a color image reading apparatus which is arranged not to uniformly correct an image data of a special image a specialist has photographed.

A still further object of the present invention is to provide a color image reading apparatus which is arranged to automatically avoid a uniform correcting process for an image data a specialist has photographed without resorting to any special operation.

These and other objects and features of the present invention will become more apparent from the following description taken in conjunction with the accompanying drawings which illustrate specific embodiments of the invention.

BRIEF DESCRIPTION OF THE DRAWINGS

FIG. 8 is a front view showing a detecting section for detecting a kind of film carrier.

FIG. 12 is a graph showing a relation between original density photographed and film transmission density in a negative film.

FIG. 21A is a block diagram showing a half part of flow of each signal processing of R, G, B read by a color CCD sensor.

FIG. 21B is a block diagram showing another half part of flow of each signal processing of R, G, B read by a color CCD sensor.

FIG. 32 is a flowchart of film carrier processing subroutine.

DESCRIPTION OF THE PREFERRED EMBODIMENT

An embodiment of the present invention will be described hereinafter referring to accompanying drawings.

The embodiment shows a color image reading apparatus which is arranged to read an image of a colored film wherein image data are variously processed and inputted to an external apparatus, for example, a digital copying machine, to obtain a variety of copying images based on the aforementioned processing.

Figure 1:
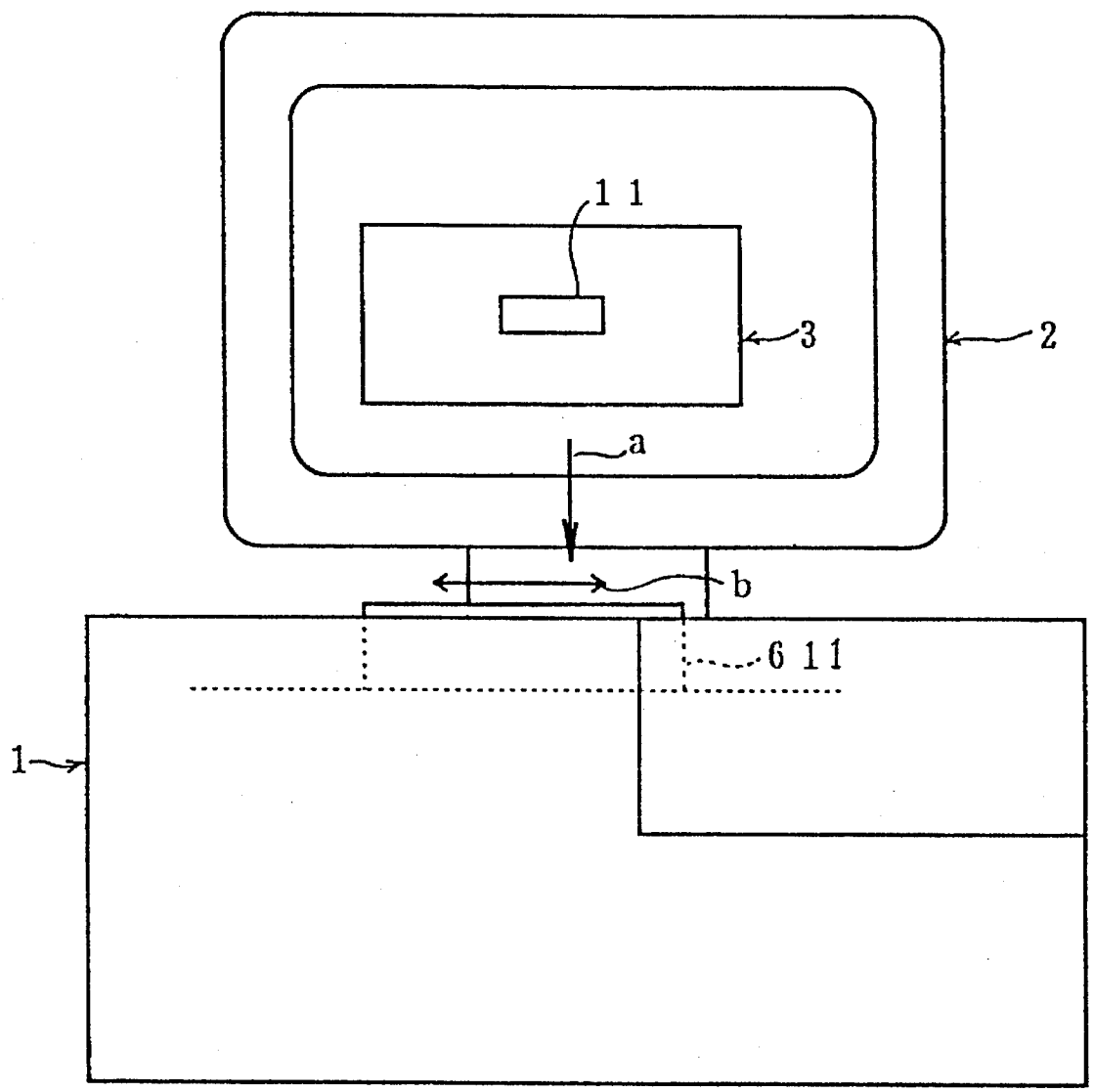
FIG. 1 is a front view showing a schematic construction of a color image reading apparatus in an embodiment of the present invention.

FIG. 1 is a front view showing a schematic construction of an apparatus in the present embodiment. As shown in FIG. 1, on the the main body of the apparatus 1 whereby an image reading and signal processing are performed, a color CRT 2 is provided for displaying an image which has been read and performing various processing.

A film 11 to be used for image reading is held by a film carrier 3 and loaded on a flatcar 611 in a direction of arrow a shown in FIG. 1. After the film is loaded, the flatcar 611 is moved in a direction of arrow b with the film carrier 3 so as to position a predetermined frame of the film 11 on the optical path of projection for an image reading operation.

Figure 2:
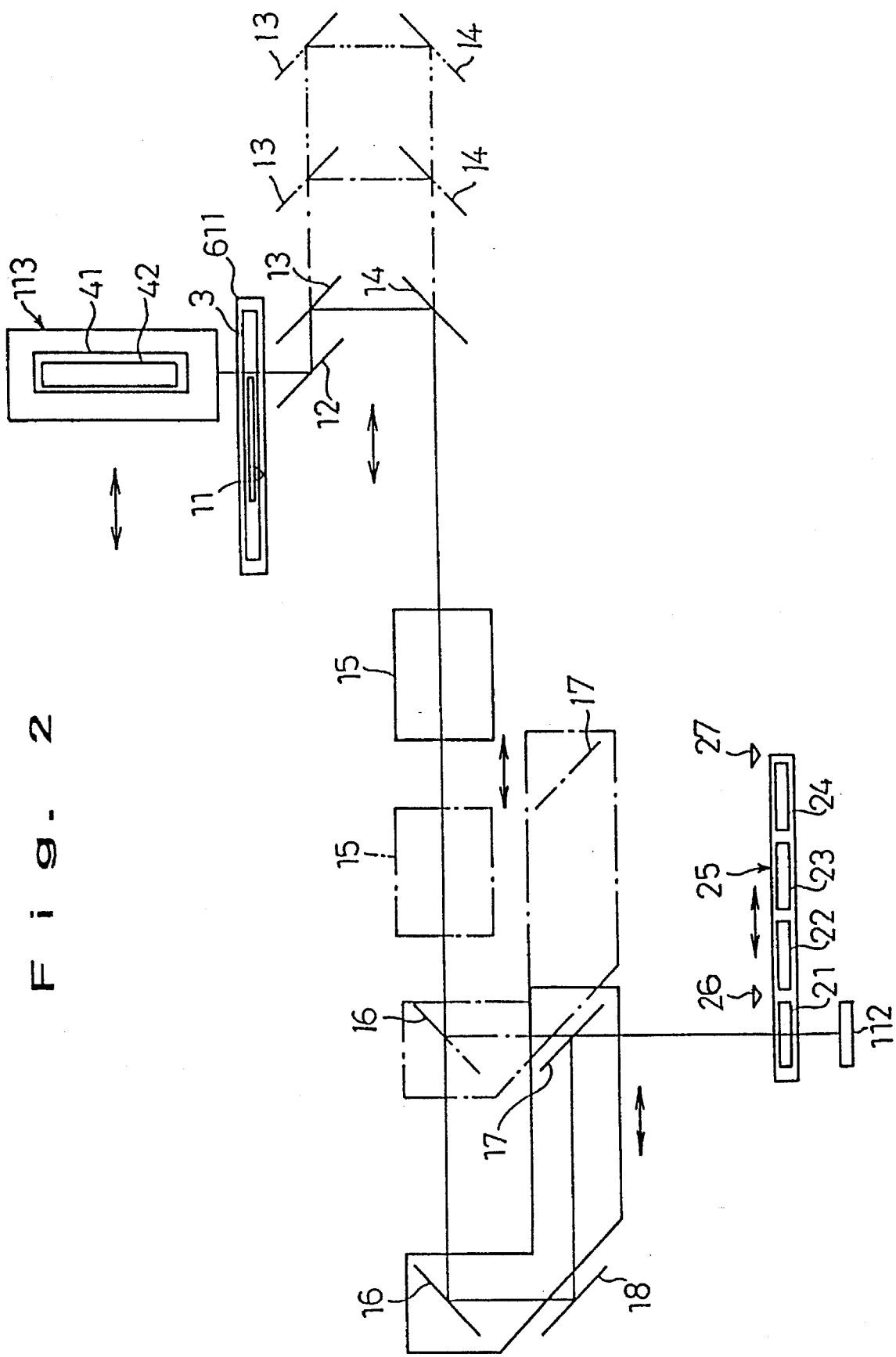
FIG. 2 is a schematic construction of the main body of an apparatus viewed from above.

FIG. 2 shows a schematic construction of an image reading apparatus viewed from the upper side of the main body of the apparatus. In the image reading apparatus of the present embodiment, a unidimensional line lighting system is adopted wherein a color CCD sensor 112 is fixed for reading a film 11 and film image. It is, therefore, arranged to move a lighting section 113 and each of first mirror, second mirror and third mirror, 12, 13, 14, reciprocatingly for reading a data in a sub-scanning direction. In the FIG. 2, the lighting section 113 and each of the first, second and third mirrors 12, 13, 14, are shown by solid lines at scan starting position.

The image reading apparatus in the present embodiment is also arranged to illuminate films in different sizes and project transmitted light to a predetermined section of each size in the CCD sensor 112 to change an image forming magnification of the color CCD sensor 112 in the optical system based on the size of film for reading images by making use of the resolution of the color CCD sensor 112.

More specifically, the magnification for a 35 mm film is 2.5050, for a 6 cm film 0.9474, and for a 4×5-inch film 0.5734 respectively in the case when the direction of a short side of the film 11 is made the main scanning direction of the color CCD sensor 112.

In changing an optical magnification, a method of changing a conjugate length is adopted wherein the positions of the second and third mirrors 13, 14, image forming lens 15 and mirrors 16, 17 behind the lens are changed. Since it is known well, further detailed description will be omitted.

In a variable magnification process for a data, a sub-scanning direction is changed by variably changing a scanning speed, and a main scanning direction is changed by electrical data processing.

With regard to a relation between a film 11 and positions of various structures, each of the second and third mirrors 13, 14 are driven together by a stepping motor provided for correcting a conjugate length.

Positions of films of each size at scan starting time are shown by a solid line for 35 mm film, by one-dot chain line for 6 cm film, by two-dots chain line for 4×5-inch film respectively. For a positional control, the same position as shown by the solid line in the FIG. 2 is for 35 mm film and 6 cm film, and for 4×5-inch film, the position is shown by one-dot chain line.

A movement and positional control of the image forming lens 15 is also conducted by making use of an unillustrated stepping motor like the case of the mirrors mentioned above. Positions of mirrors 16, 17 provided at the back of lens are shown by a solid line relative to a 35 mm film in the FIG. 2 to cooperate with a fixed mirror 18 at the back of lens, and relative to a 6 cm film and 4×5-inch film, a position is shown by a one-dot chain line to be operated independently of the fixed mirror 18.

The fixed mirror 18 at the back of lens to be used for reading an image of 35 mm film is, therefore, fixed at the position of the solid line shown in the FIG. 2, and is positioned within the optical path relative to the mirrors 16, 17, which have reached the position of the solid line for reading an image of the 35 mm film, however, relative to the mirrors 16, 17, which have reached the position of the one-dot chain line for reading an image of the 6 cm film and 4×5-inch film, it comes off the optical path. The positions of the mirrors 16, 17, are also controlled by an unillustrated stepping motor exclusively provided like the aforementioned mirrors and image forming lens.

In front of the color CCD sensor 112, there is provided a filter section 25 wherein four kinds of filters 21, 22, 23, 24 are loaded. The filter section 25 is provided with a function to match a light amount to the color CCD sensor 112 and the balance of R, G, and B with a standard condition corresponding to negative and positive film. The filter 21 is inserted when an image of negative film is actually read. For example, an LB100 is used. The filter 22 is inserted when an image of positive film is actually read. An ND filter is used for example. The filter 23 is inserted when a data for correcting shading of negative film is taken in. The filter 24 is inserted when the data for correcting shading of positive film is taken in.

The filters are separably used when an actual operation is performed and when a shading correction data is taken in. Since there is not any film loaded when a shading correction data is taken in, and there is a film loaded when an actual operation is performed, there causes differences in the quantity of light and balance, and therefore, the difference has to be corrected. The change of a filter in the filter section 25 is conducted by an unillustrated stepping motor like the mirrors mentioned above. As an auxiliary mechanism, there are provided a sensor 26 for detecting the limit of the right position and a sensor 27 for detecting the limit of the left position in a range of movement of the filter section. By providing the filter section 25 in front of the color CCD sensor 112, the filters 21, 22, 23, 24 can be made small in size substantially the same as that of the color CCD sensor 112, and the filter section 25 can also be arranged extremely small in size with a necessary margin added to it.

Figure 3:
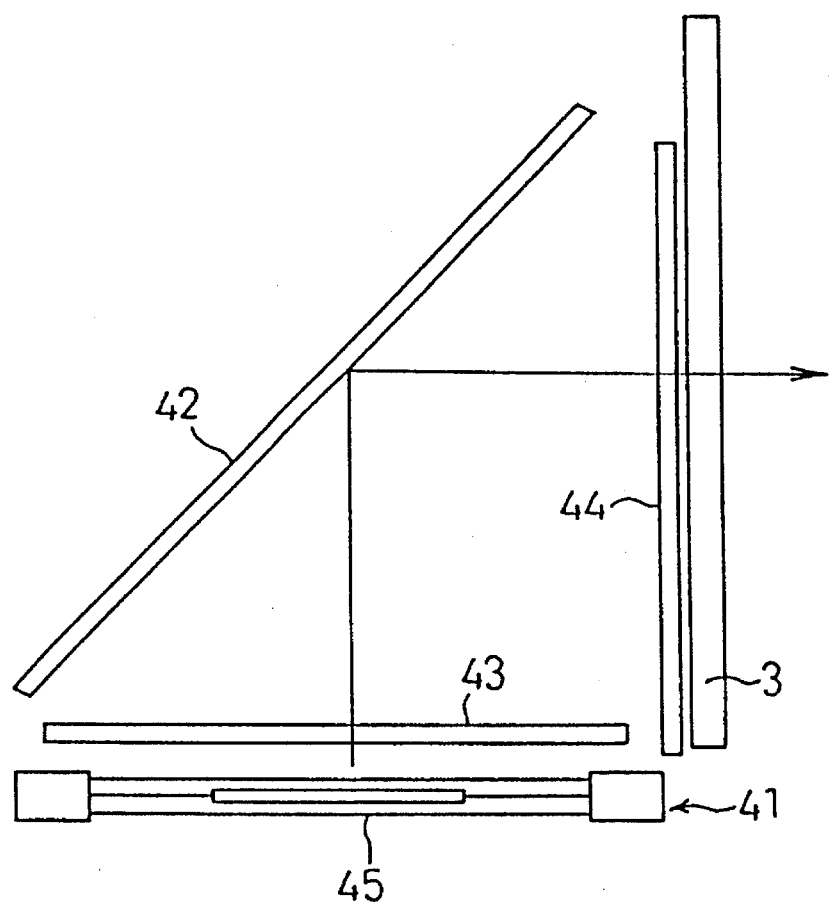
FIG. 3 is a side view showing a schematic construction of a lighting section.

A scanning for reading a film in a sub-scanning direction is conducted by an unillustrated stepping motor provided for a scanning operation by driving the lighting section 113 and each of the first, second, third mirrors 12, 13 and 14. The lighting section 113 comprises an exchangeable lamp unit 41, a light-path folding mirror 42, a heat protection filter 43 shown in FIG. 3, and a semicylindrical lens 44 having light collecting face and light diffusing face on both faces and illuminates a film 11 held by the film carrier 3 loaded on the flatcar 611 positioned between the lighting section 113 and the moving area of each first, second and third mirrors, 12, 13, 14, thereby forming an image of the film 11 on the color CCD sensor 112 by the image forming lens 15.

The folding mirror 42 is provided for guiding an illuminated light emitted from a halogen lamp 45 horizontally set in the lamp unit 41 to a film vertically disposed at a position higher than the position where the lamp is disposed. The semicylindrical lens 44 is provided for improving convergence of light, and the light diffusing face of the lens is arranged to prevent adhered dust from springing out on an image projected.

Figure 4:
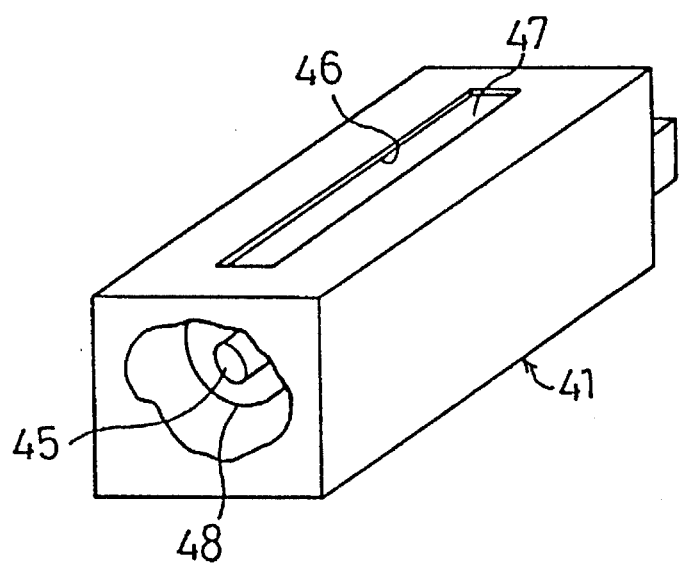
FIG. 4 is a perspective view showing a lamp unit.
Figure 5:
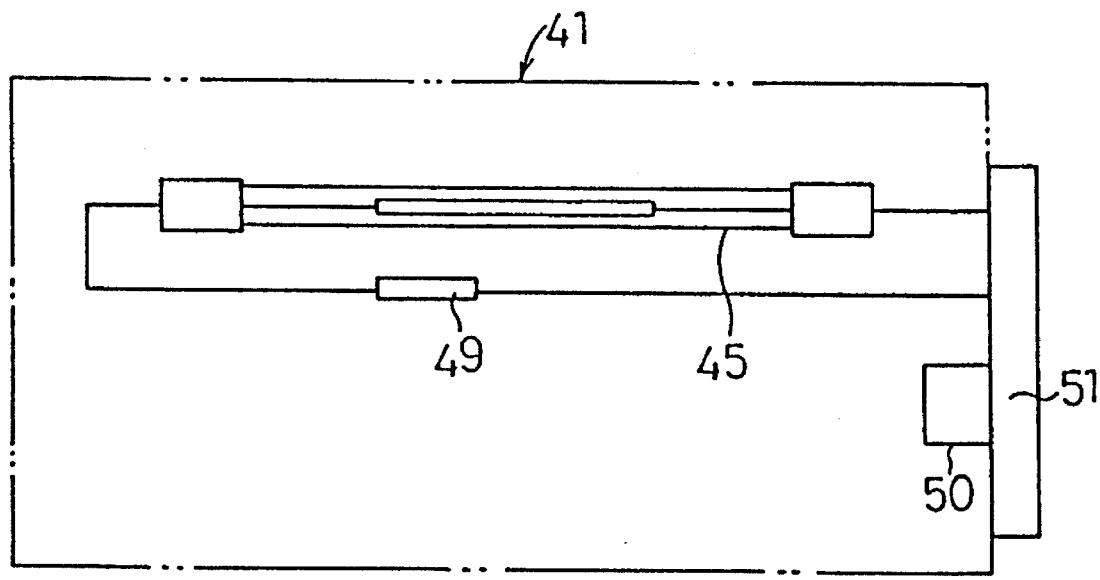
FIG. 5 is a conceptional view showing internal construction of a lamp unit.

As shown in FIG. 4, the lamp unit 41 is formed in a box shape, and a light throwing window 46 is provided at the top of the unit. In the unit, there is provided a shutter 47 which is arranged to either open the light throwing window 46 when a lamp 45 is loaded or close the window 46 when a lamp 45 is not loaded. As illustrated in FIGS. 4 and 5, the lamp unit 41 includes a reflecting shade 48 for directing the light emitted from the lamp 45 toward the light throwing window 46, a short wire 50 for distinguishing a kind of lamp unit 41, and a connector 51 for electrically connecting the lamp unit 41 with the main body of the apparatus 1 when the unit 41 is mounted on the main body of the apparatus 1. In the short wire 50, two-bits code is preliminarily set, and a connecting state of two short wires 50 is identified by taking in a data from a parallel I/O port 206 by CPU 200 shown in FIG. 10.

Figure 6:
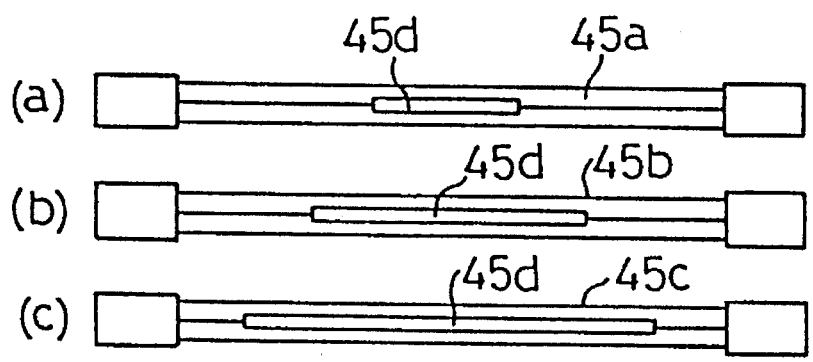
FIG. 6 is a figure showing kinds of lamp.

Three kinds of lamp units 41 are provided as illustrated in FIG. 6, wherein (a) shows a lamp unit provided with a lamp 45a for 35 mm film, (b) a lamp unit provided with a lamp 45b for 6 cm film, and (c) a lamp unit provided with a lamp 45c for 4×5-inch film respectively, and they are exchanged according to a requirement. It is arranged that accompanying with an enlargement of the size of a film 11, the length of an effective light emitting section 45d of the lamp units 45a–45c becomes larger.

If the lamp 45 is commonly used, a lamp 45 in enormous wattage is required whereby an unnecessarily large electricity is consumed even when a smaller size film 11 is projected. There is also a problem especially when a film 11 which possesses smaller tolerance against temperature is used. Such a problem can, however, be solved by changing a kind of lamp 45 corresponding to the size of a film 11 though each of the lamps 45a–45c should be properly selected and used corresponding to the size of a film 11. In order to ensure the selection, a kind of lamp unit 41 mounted on the main body of the apparatus 1 is automatically detected.

Figure 7:
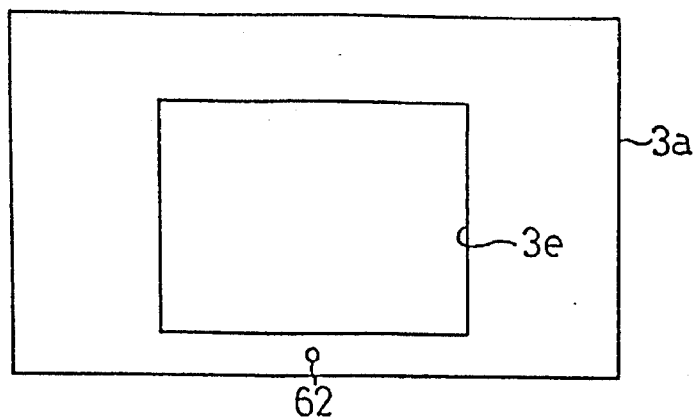
FIG. 7 is a front view showing film carriers.
Figure 7:
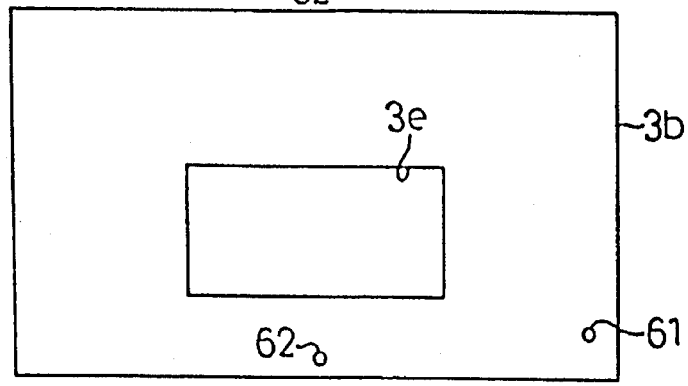
Figure 7:
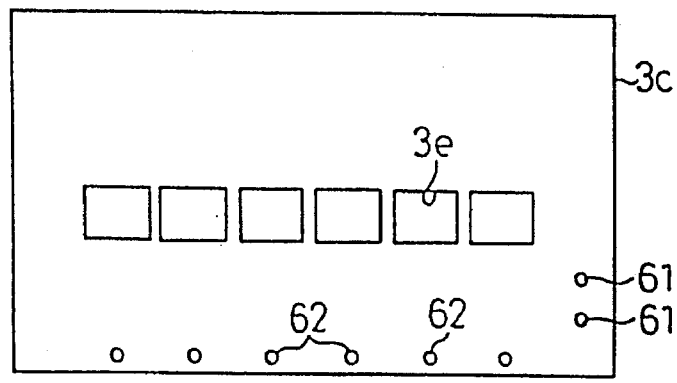
Figure 7:
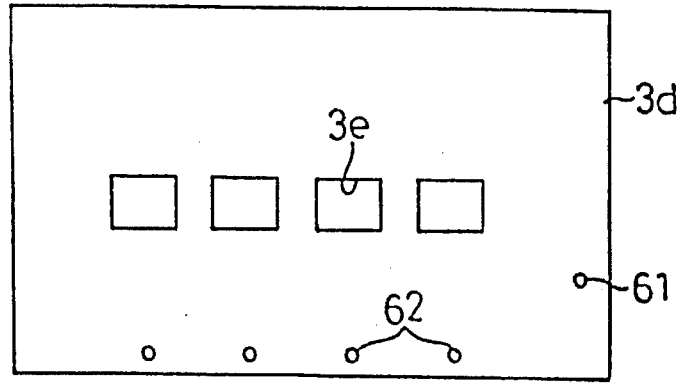

There are four kinds of film carriers 3 as illustrated in FIG. 7, wherein (a) shows a film carrier 3a for 4×5-inch film, (b) a film carrier 3b for 6 cm film, (c) a film carrier 3c for 35 mm continuous film, and (d) a film carrier 3d for 35 mm mounted film. The film carrier 3b for 6 cm film is provided with a projection window 3e of 6×9 mm to cope with various sizes of 6 cm film which covers the sizes of 6×4.5, 6×6, 6×7, and 6×9.

In each one of the film carriers 3a–3d, two supporting plates on both sides are opened and closed with an upper hinge connecting section as a supporting point to insert and draw out a film 11. The external dimension of each one of the film carriers 3a–3d is made the same to unify the condition to be received by the main body of the apparatus 1 so that the construction of the main body 1 and a detachable operation can be simplified.

Each one of the film carriers 3a–3d differs by the position of a hole 61 provided for detecting a kind of film, the number of holes, the condition whether there is a hole or not. A kind of film held by each one of the film carriers is thus optically detected.

In each one of the film carriers 3a–3d, there is also provided a hole 62 for detecting a proper setting position of each film carrier relative to each film projection window 3e whereby the films held by each of the film carriers 3a–3d are optically detected whether they are properly set on the light path of projection.

In a flatcar 611 which holds and moves the film carrier 3, there are stored in a way of inserting a film carrier 3a–3d transmission photo sensors 162, 163 for detecting a kind of film carrier 3a–3d, and a transmission photo sensor 164 for detecting whether a film carrier 3a–3d is mounted or not. At the location adjacent to the position where flatcar 611 of the main body 1 moves, there is provided a transmission photo sensor 165 for detecting a state how each of the film carriers 3a–3d is set in a way of inserting the flatcar 611.

Figure 9:
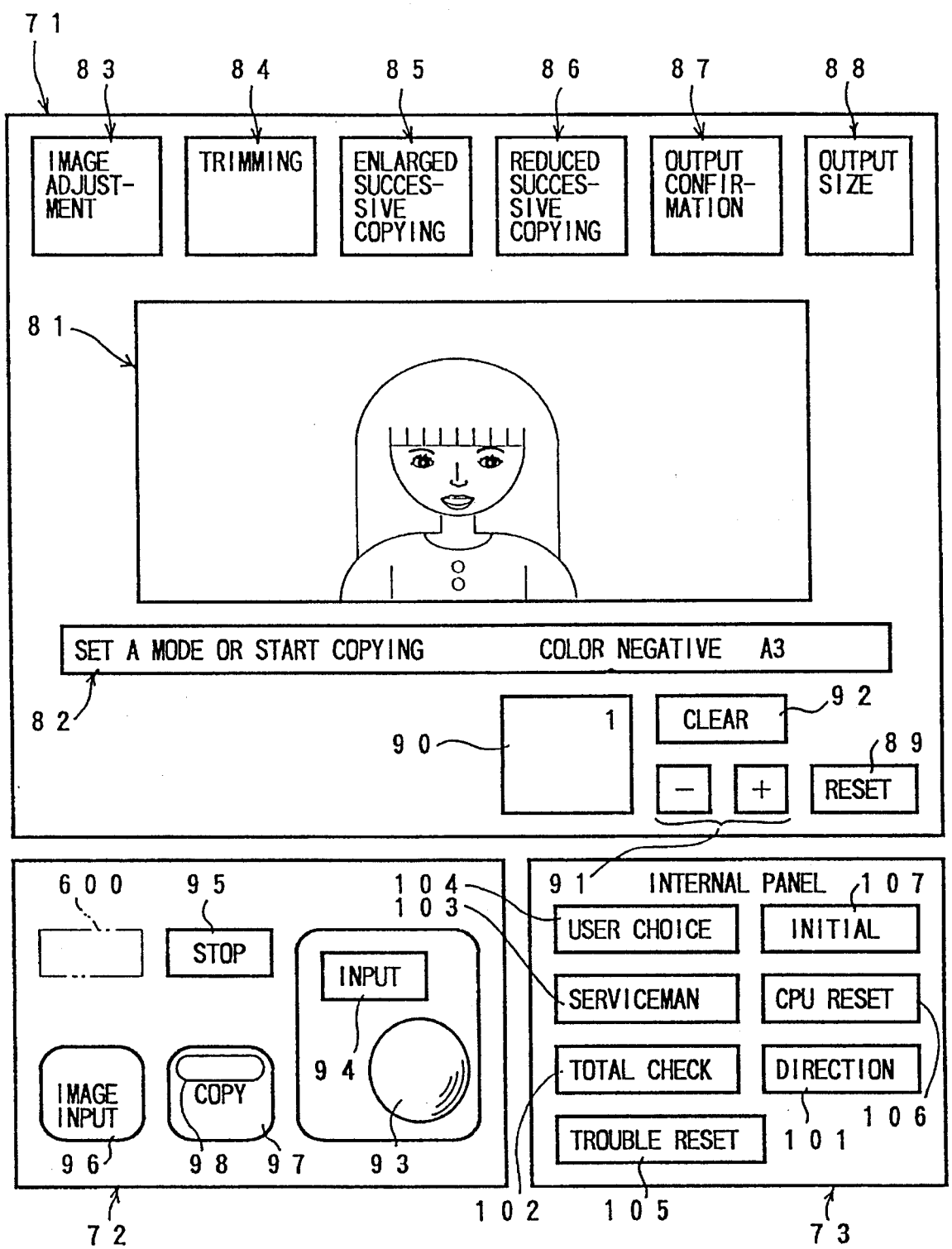
FIG. 9 is a front view showing a color CRT, and an operation panel and internal panel.

As illustrated in FIG. 9, a color CRT 2 comprises a monitor display section 71 for indicating an image read from a film 11, for setting a copy mode and trimming area, an operation panel 72 for indicating a print operation, and an internal panel 73.

The monitor display section 71 includes the following display section and control section.

Image display area 81 for indicating a film image which has been read.

Message display section 82 for indicating a kind of lamp unit required and a kind of film carrier 3. It also indicates that a shading correction data is being taken in, and a message for taking out a film carrier as well as a kind of film and the size of a sheet of paper for an output.

Image adjusting button 83: When an image is adjusted, a submenu is indicated by selecting the button 83 by cursor to enable a setting of an image adjustment such as color balance.

Trimming button 84 for setting a trimming mode.

Enlarged successive copying button 85 for setting an enlarged successive copying mode. By selecting this button, a submenu is indicated to enable a setting of an output size.

Reduced successive copying button 86 for setting a reduced successive copying mode.

Output confirming button 87 for confirming an output of indicating a relation between an image to be printed out and the size of a sheet.

Output size button 88 for designating the size of a sheet for a printer. By selecting this button, a submenu is indicated to enable a setting of the size of a sheet.

Reset button 89 for initializing a copy mode which has been set.

The number of sheets display section 90 for indicating the number of sheets to be printed.

The number of sheets setting section for setting the number of sheets to be printed.

Clear button 92 for clearing the number of sheets set for a print.

The operation panel 72 is provided with the following members.

Track ball 93: A required process is selected by moving a cursor on the monitor display section 71 to a position of various process buttons indicated. The movement of a cursor is conducted by indicating an amount of movement in a direction of X with an X direction pulse which corresponds to a direction and amount of rotation of the track ball 93, and an amount of movement in a direction of Y with a Y direction pulse.

Track ball key 94: An instruction signal which corresponds to a process for a position of cursor operated by the track ball 93 is inputted into CPU200.

Stop key 95 for indicating an interruption of a copying and image inputting operation.

Image input key 96 for instructing to read a film image and indicate it on the color CRT2.

Print key 97 for instructing the start of a copying operation.

Copy permission, prohibition display 98 for indicating whether a copying operation is permitted or prohibited based on the state whether the light is turned on or not.

The internal panel 73 is provided with the following control section and display section.

Direction code display section 101 for indicating a direction.

Total counter 102 for indicating a total number of copy sheet.

Serviceman key 103 for instructing a setting of an operation mode by a serviceman.

User key 104 for indicating a setting of user's selection mode.

Trouble reset key 105 for releasing a state of internal trouble.

CPU reset key 106 for mechanically resetting CPU200.

Initial key 107 for instructing an initial setting.

Figure 10:
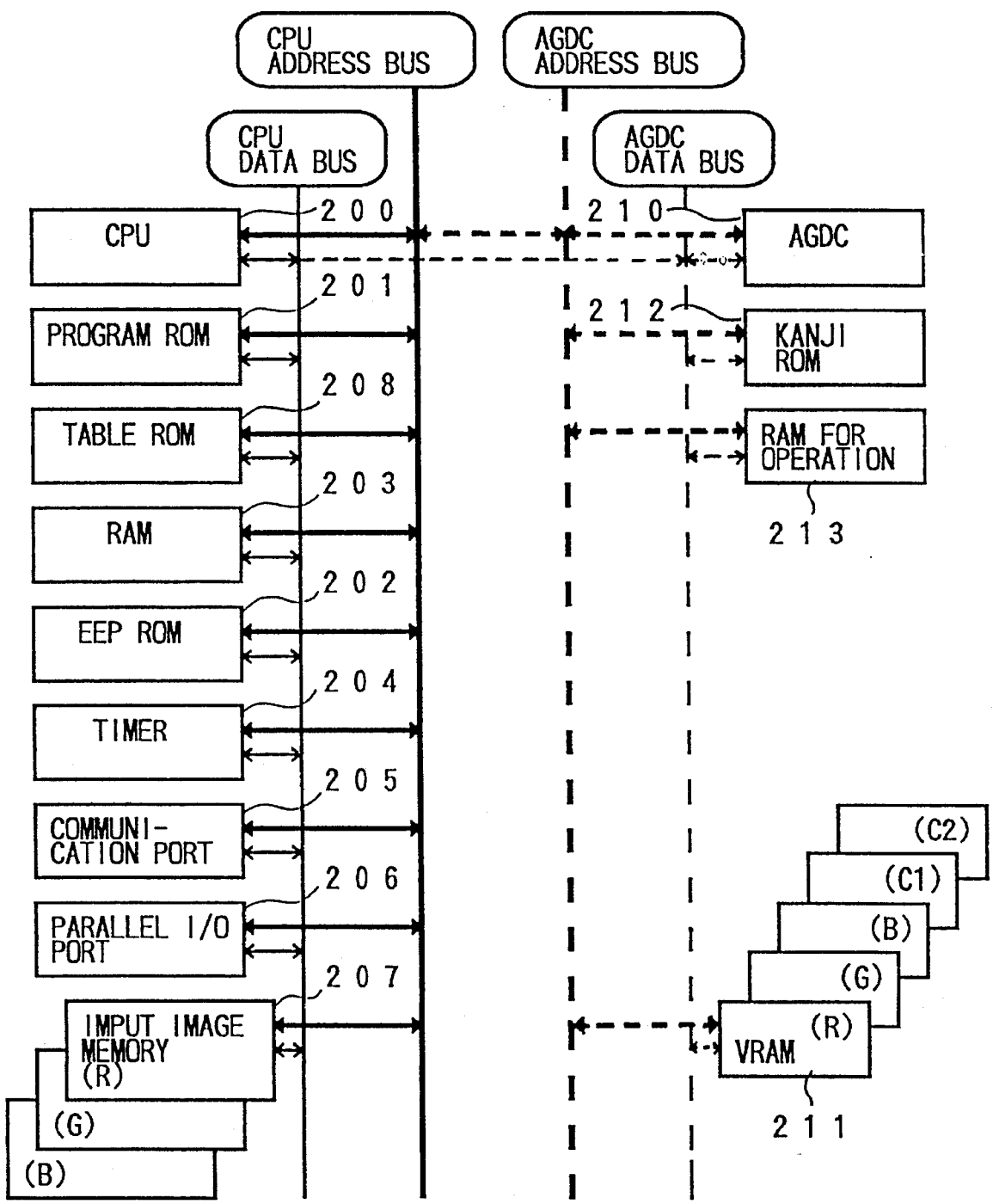
FIG. 10 is a block diagram showing CPU and peripheral devices.

A circuit diagram surrounding the CPU200 is shown in FIG. 10. The CPU200 controls the entire apparatus based on the contents of a program stored in a program ROM201. At the periphery of the CPU200, the following devices are connected by CPU address bus and CPU data bus.

EEP ROM202 which stores parameter for adjusting dispersion between each device. It is able read and write electrically.

RAM203 for storing a variable required for executing a program.

Timer 204 for making up a predetermined timer value from a clock signal set by the CPU200.

Communication port 205 for communicating information with external apparatus.

Parallel I/O port 206 for outputting a control signal for controlling peripheral devices and inputting a signal of the state of peripheral devices.

Input image memory 207 for storing an image data read by the color CCD sensor 112.

Table ROM208 for storing a required table information.

AGDC 210 for controlling a display of the color CRT2 by controlling the contents of VRAM211.

At the periphery of AGDC 210, the following devices are connected by AGDC bus and AGDC data bus.

VRAM 211 which stores data related to display control of color CRT 2.

KANJI (Chinese character) ROM 212 which generates graphic data of Chinese character from Chinese character code.

RAM 213 provided for an operation which is used as operation area when the contents of VRAM 211 is controlled.

Each of CPU address bus and AGDC address bus, and CPU data bus and AGDC data bus are connected through AGDC 210 respectively.

Figure 11A:
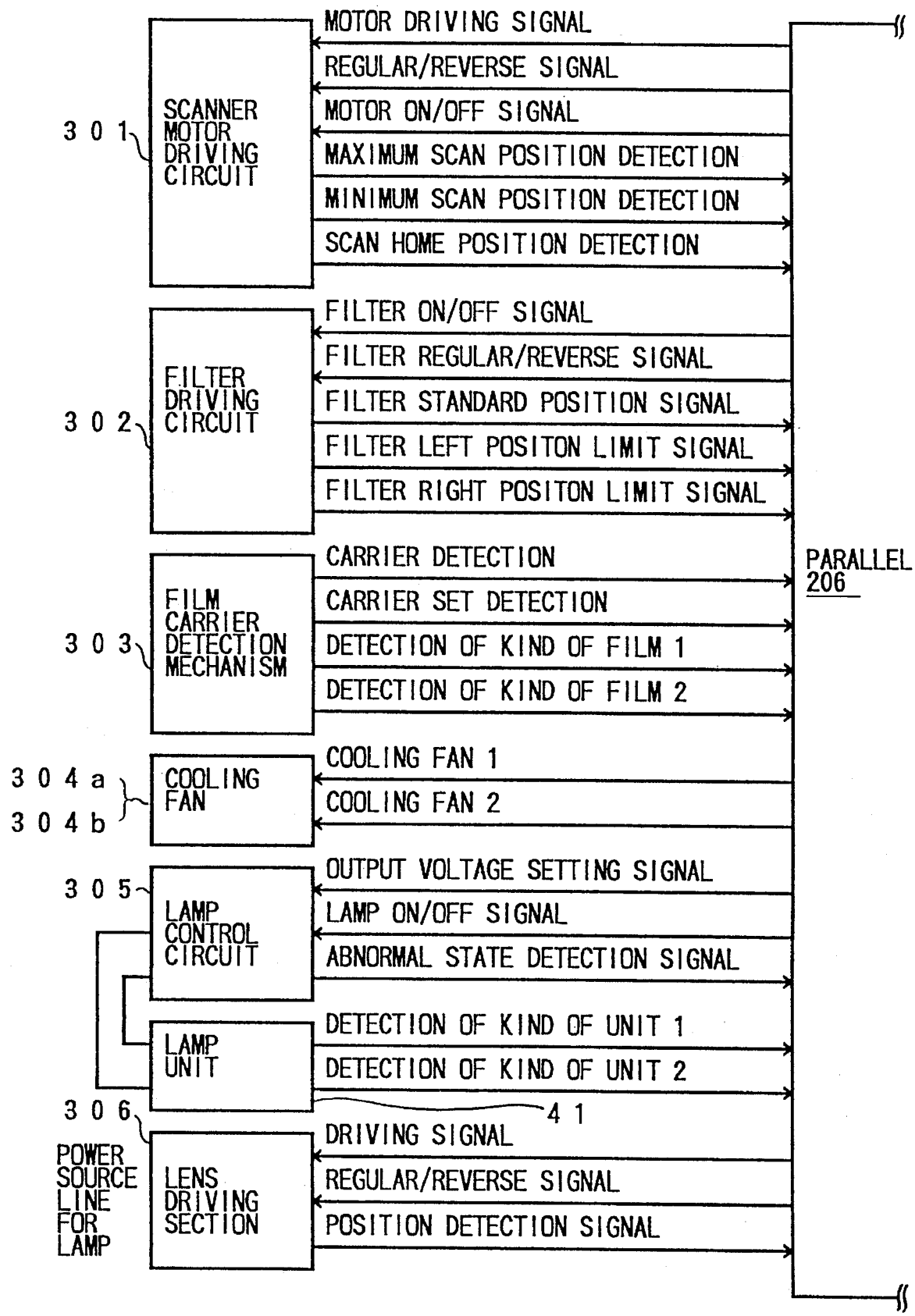
FIG. 11A is a block diagram showing a half part of parallel I/O and circuits connected.
Figure 11B:
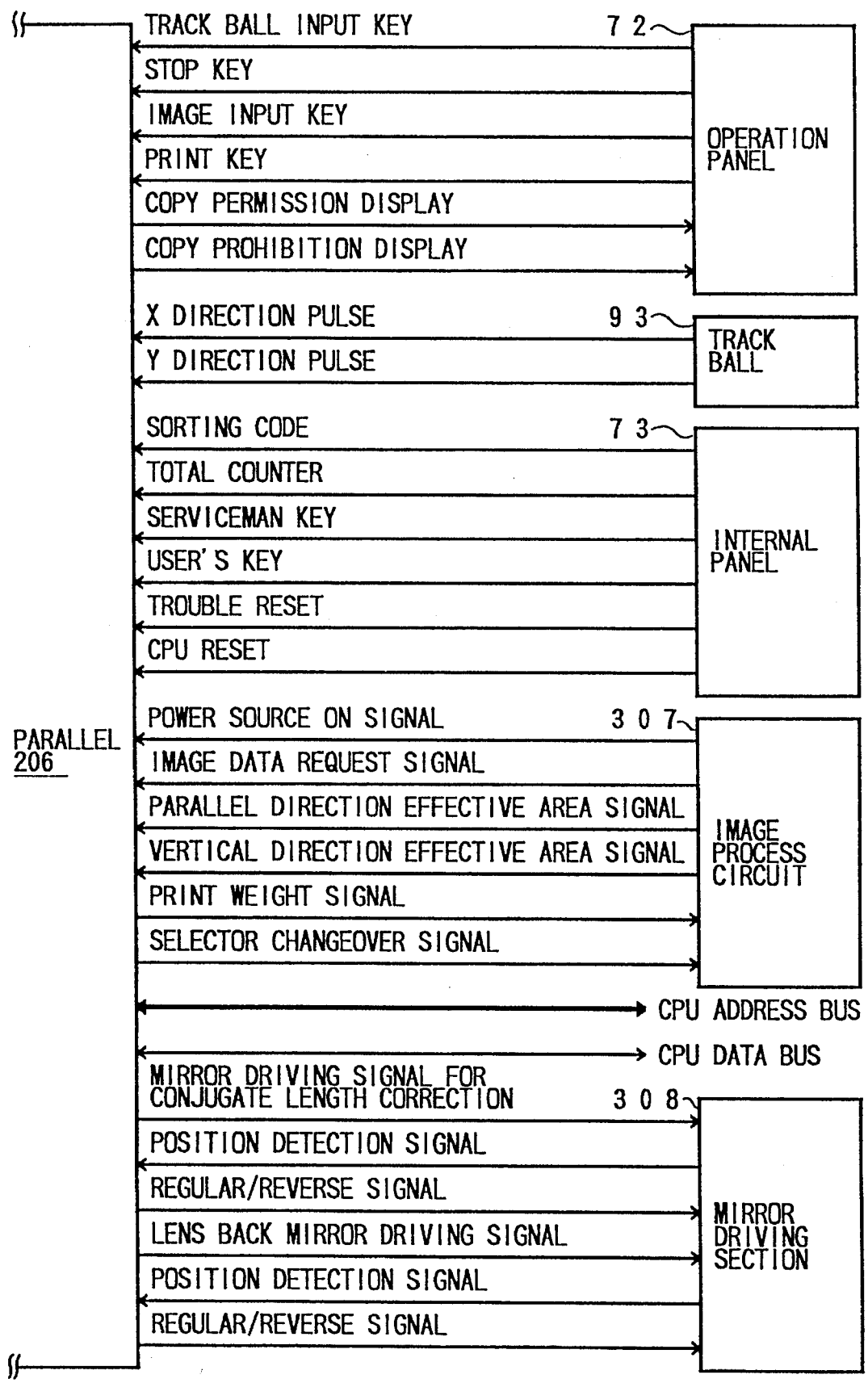
FIG. 11B is a block diagram showing another half part of parallel I/O and circuits connected.

In FIG. 11, there is shown a signal input/output section centering around parallel I/O port to which connected are scanner motor driving circuit 301, filter driving circuit 302, film carrier detection mechanism 303, cooling fans 304a, 304b, lamp control circuit 305, lamp unit 41, lens driving circuit 306, operation panel 72, internal panel 73, track ball 93, image processing circuit 307 and mirror driving section 308.

The scanner motor driving circuit 301 is provided for moving each of the first, second, third mirrors 12, 13, 14, and a lighting section 113 at a predetermined speed by instructions from CPU 200 to drive a scanner which is able to move them altogether. As a safety measure, the maximum and minimum scanning positions are detected to prevent a crash caused by over scanning under abnormal condition.

The scanner is controlled by the following signals, however, since it is known well, description will be omitted.

Motor driving signal which instructs a speed of rotation of motor.

Regular/reverse rotation signal which instructs rotating direction of motor.

Maximum scan position detecting signal which indicates that the scanner is at the maximum scan position.

Minimum scan position detecting signal which indicates that the scanner is at the minimum scan position.

Scan home position detecting signal which indicates that the scanner is at scan home position.

The filter driving circuit 302 drives a filter section 25 so as to changeover four kinds of filters 21–24 by an operation mode.

The filter section 25 is controlled by the following signals. A stepping motor is used for driving, and positioning is conducted by controlling the number of driving steps from a standard position detecting sensor.

On/Off signal in the filter section for moving and stopping the filter section 25.

Regular/reverse rotation signal in the filter section for instructing a direction of movement of the filter section 25.

Limit of right position signal in the filter section for indicating that the filter section 25 is at the limit of right position.

Limit of left position signal in the filter section for indicating that the filter section 25 is at the limit of left position.

The film carrier detecting mechanism 303 is provided for distinguishing a kind of said film carriers 3a–3d, detecting whether film carrier 3 is set or not, and detecting a state whether film carrier is properly set at a predetermined position. The following signals are used.

Carrier detecting signal which indicates that film carrier 3 is mounted in the main body of the apparatus 1.

Carrier set detecting signal which indicates whether each of the film carriers 3 is set at a normal position for projection.

Kind of film detecting signals 1, 2 for distinguishing a kind of film 11 by a kind of film carrier 3a–3d set by photo sensor 61.

Description will now be made on a combination of a kind of film detecting signals 1 and 2, and a kind of film 11 which is indicated by the combination of the signal that are shown in Table 1 below.

|  | 35 mm Continuous Film | 35 mm Mounted Film | 6 cm Film | 4 × 5 inch Film |
| --- | --- | --- | --- | --- |
| Kind of Film Detecting Signal 1 | Low | Low | High | High |
| Kind of Film Detecting Signal 2 | Low | High | Low | High |

The lamp control circuit 305 controls a quantity of light of the lamp 45, and turning on and off of the light. A DC voltage to be applied to the lamp 45 from the lamp control circuit 305 is supplied to the lamp unit 41. The following signals are used for this control.

Output voltage setting signal provided for setting an impressed voltage to the lamp 45 which is given by five bits signal.

Lamp on/off signal for controlling turning on/off of the lamp 45.

Abnormal state detecting signal for detecting an abnormal state of lighting and the time when lamp is run down.

A lamp unit 41 needs to be selectively used to suit to a kind of film 11. In order to meet this requirement, the aforementioned signals of kind of lamp unit detecting signals 1, 2, and a signal by a short wire 50 provided for detecting a kind of lamp unit 41 and attachment of the lamp unit are used.

The relations between a combination of the kind of lamp unit detecting signals 1, 2 and a kind of lamp unit 41 and a condition of the attachment/detachment of the lamp unit are as shown in Table 2 below.

| Code | | |
| --- | --- | --- |
| Kind of Unit Detecting Signal 2 | Kind of Unit Detecting Signal 1 | Judgment |
| High | High | Unit is not mounted. |
| High | Low | Unit for 35 mm film |
| Low | High | Unit for 6 cm film |
| Low | Low | Unit for 4 × 5-inch film |

Cooling fans 304a and 304b are operated in order to keep optical system and inside the apparatus under a predetermined temperature, and they are are controlled by the following signals.

Cooling fans 1, 2 to control turning on/off of the cooling fans 304a and 304b.

Lens driving circuit 305 is changed over according to the size of a film 11 which is used at the position of an image forming lens 15. The position of a lens is controlled by the following signals. Stepping motor is used for driving, and a positioning is conducted by controlling the number of steps from the standard position detecting sensor.

Driving signal provided for controlling the lens driving motor when it is driven and stopped.

Regular/Reverse signals for instructing a driving direction of the lens driving motor.

Position detecting signal which indicate that a lens is at a standard position.

Mirror driving section 307 is arranged to change the positions of each of the second and third mirror sections 13, 14, and mirrors 16, 17 at the back of lens in order to change an image forming magnification of optical system based on the size of a film 11.

The positions of each of the second and third mirrors 13, 14, and the mirrors 16, 17 are controlled by the following signals. Each of them is driven by a stepping motor, and a positioning is conducted by controlling the number of driving steps from respective standard position detecting sensor.

Second and third mirror driving signals for conjugate length correction either drive or stop each of the second and third mirrors 13, 14.

Position detecting signal which indicates that each of the second and third mirrors 13, 14 are at standard position.

Regular/Reverse rotation signal for instructing an operating direction of each of the second and third mirrors 13, 14.

Mirror at the back of lens driving signal either drive or stop the mirrors 16, 17 at the back of lens.

Position detecting sensor which indicates that mirrors 16, 17 are at standard position.

Regular/Reverse rotation signal for instructing either regular or reverse rotation of the mirrors 16, 17 at the back of lens.

With regard to an image process circuit, image data is transmitted by exchanging the following unillustrated signals with a copying apparatus besides communication line.

Power source on signal which indicates whether a printer section is turned on or not.

Image data request signal which indicates a transmitting timing of an image signal.

Effective area signal in a parallel direction which indicates an area where a printing can be performed in a parallel direction.

Effective area signal in a vertical direction which indicates an area where a printing can be performed in a vertical direction.

Wait for printing signal which indicates a state that an image signal can not be transmitted.

Selector changeover signal which instructs the changeover of an image signal in the image process circuit.

A film transmission density of film 11 largely differs depending on a kind of film and a condition when a picture is taken.

FIG. 12 is a graph showing a relation between photographed original density (neutral color) on a 35 mm negative film and transmission density of the film. An exposure condition when photographed is taken as parameter. In the figure, −3∼++6 show exposure conditions. As it is clear from the graph, film transmission density widely differs depending on an exposure condition.

Figure 13:
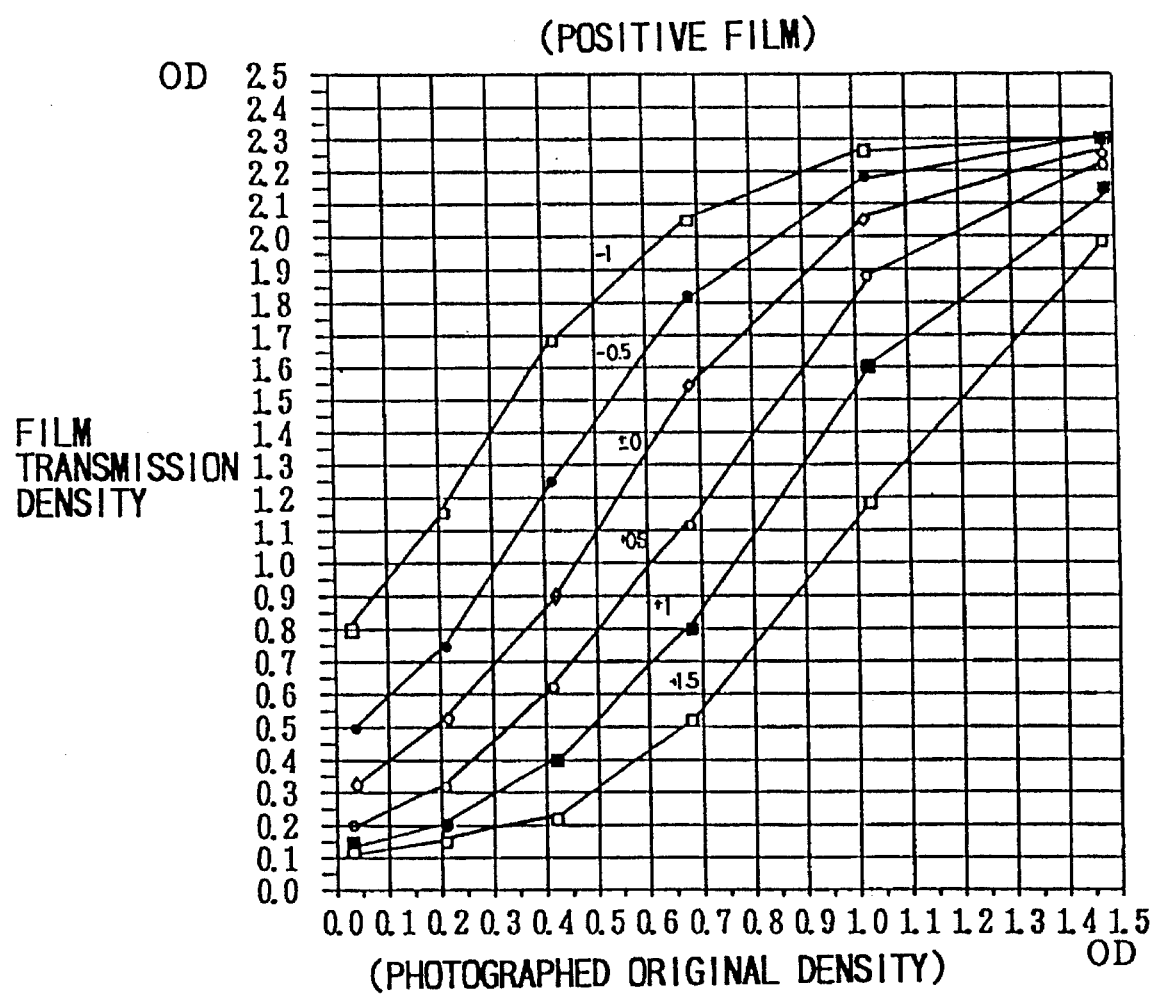
FIG. 13 is a graph showing a relation between original density photographed and film transmission density in a positive film.

FIG. 13 is a graph showing a relation between photographed density (neutral color) on a 35 mm positive film and transmission density of the film. An exposure condition when photographed is taken as parameter. In the figure, −1∼++1.5 show exposure conditions. As it is clear from the graph, a film transmission density more widely differs depending on an exposure condition than in the case of negative film mentioned above.

Figure 14:
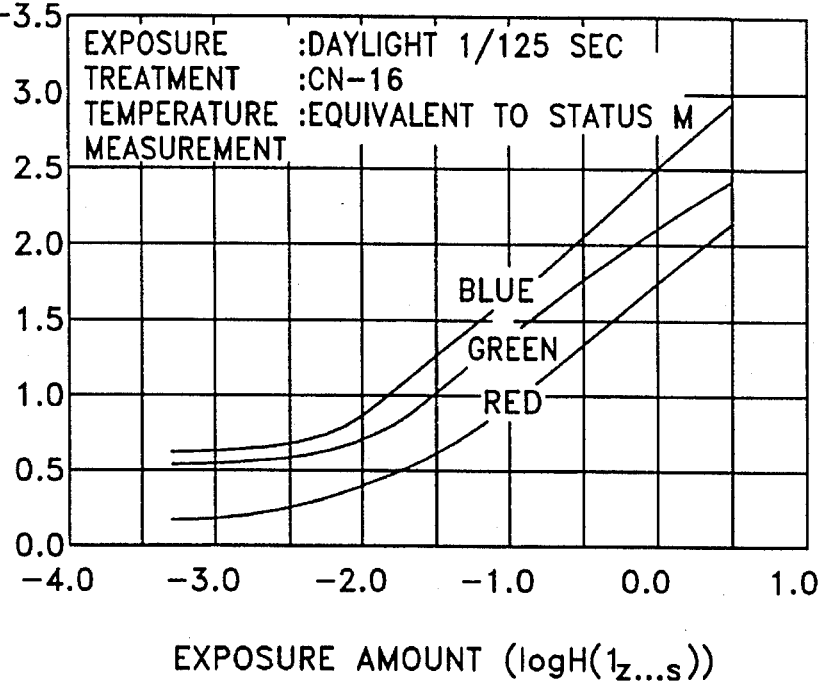
FIG. 14 is a graph showing a relation between exposure condition of FUJI Color SUPER HG100 Film and R,G,B density.
Figure 15:
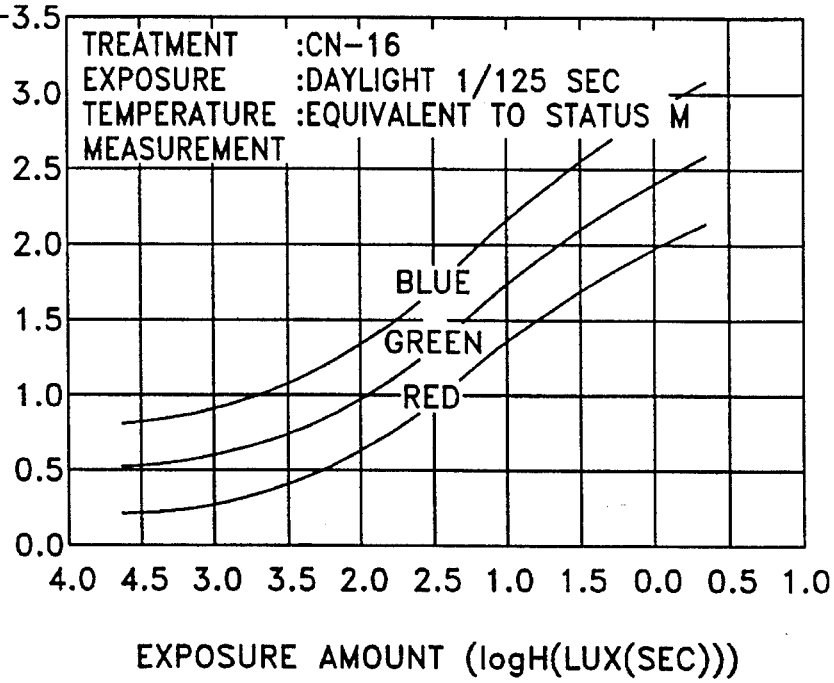
FIG. 15 is a graph showing a relation between exposure condition of FUJI Color SUPER HG400 Film and R, G, B density.
Figure 16:
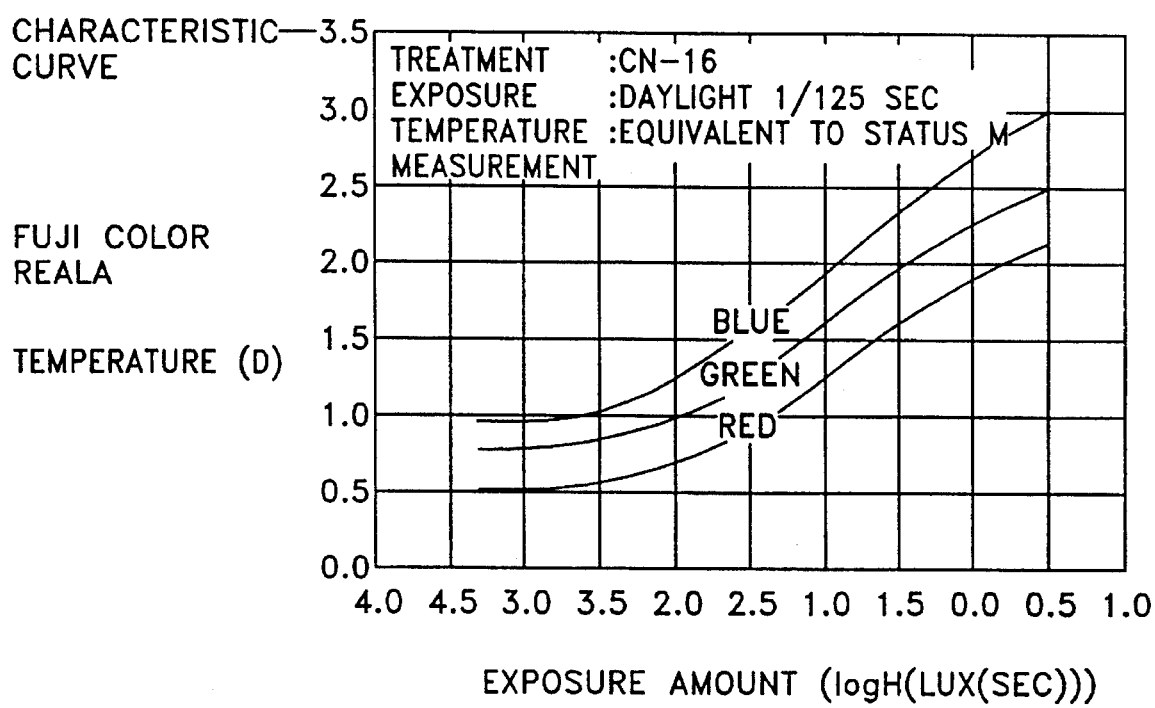
FIG. 16 is a graph showing a relation between exposure condition of FUJI Color REALA Film and R,G,B density.

FIGS. 14 through 16 show density characteristics of R, G, and B corresponding to a kind of positive film. As to the kind of positive film, Fuji Color SUPER HG100 (FIG. 14), Fuji color SUPER HG400 (FIG. 15) and Fuji color REAL A (FIG. 16) are used for example. As it is clear from the FIGS. 14 through 16, a balance of R, G, and B in an ordinary range of use differs depending on a kind of film.

Figure 17:
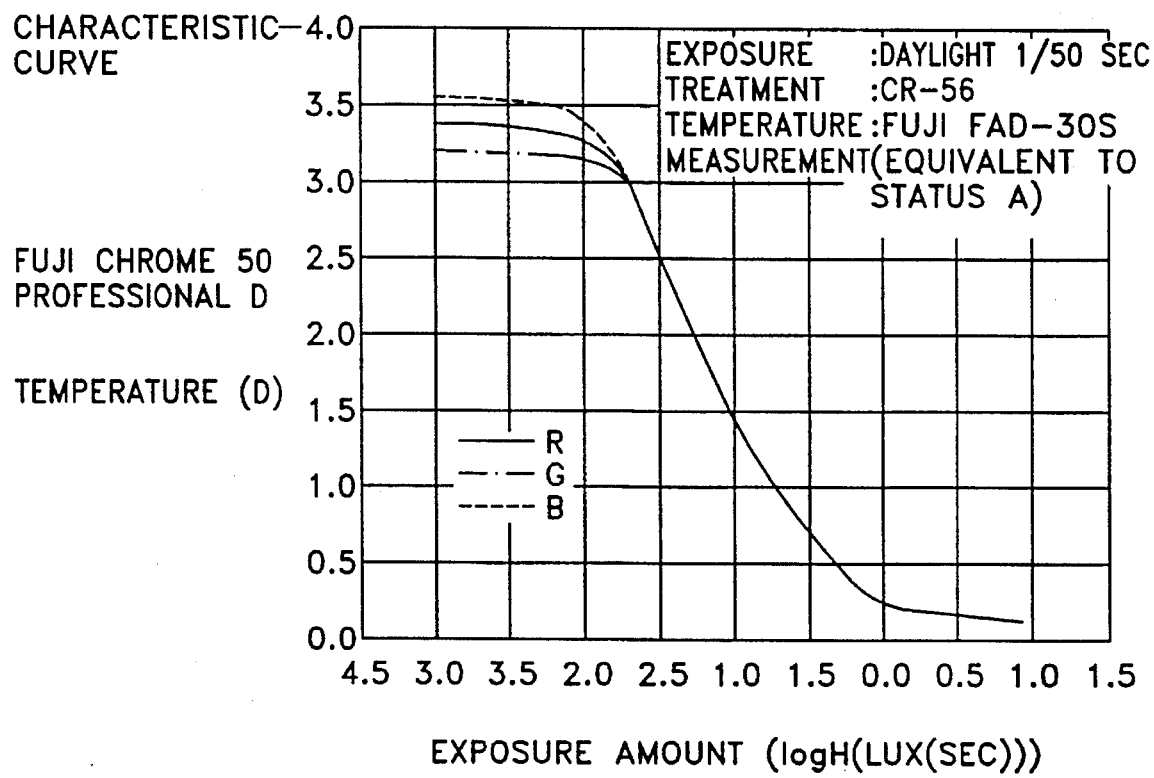
FIG. 17 is a graph showing a relation between exposure condition of FUJI Chrome 50 Profesional Positive Film and R, G, B density.
Figure 18:
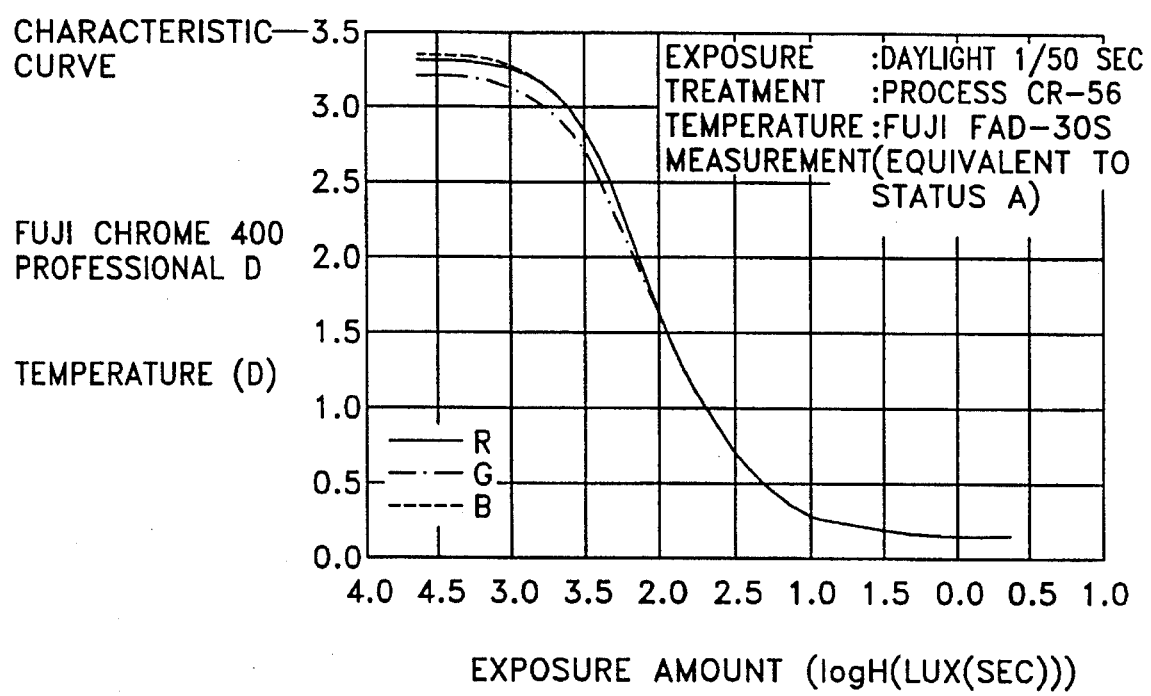
FIG. 18 is a graph showing a relation between exposure condition of FUJI Chrome 400 Professional Positive Film and R,G,B density.

FIGS. 17 and 18 show sensitive characteristics of R, G, and B corresponding to a kind of negative film. As to the kind of negative film, Fuji chrome 50 (FIG. 17), and Fuji Chrome 400 (FIG. 18) are used for example. As it is clear from the FIGS. 17 and 18, a balance of R, G, and B in an ordinary range of use does not differ much as compared with the case of positive film.

In the present embodiment, when a color image of color film is read, a gain correction corresponding to different exposure condition is performed on each signal of R, G, and B, and a gain correction corresponding to different sensitivity of R, G, B, based on a kind of film are performed.

Figure 19:
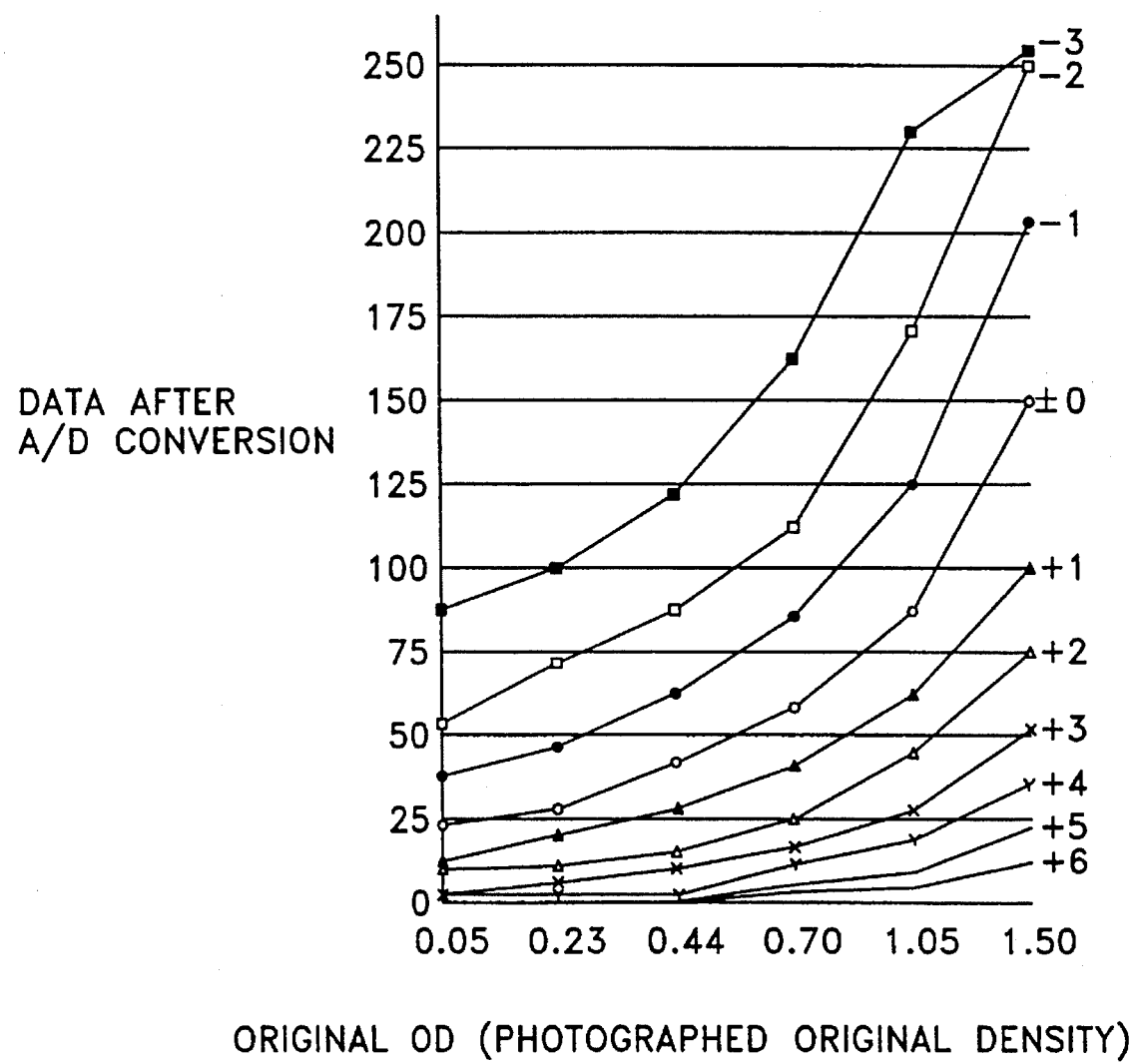
FIG. 19 is a graph showing a relation in a negative film between original density photographed and a data after A/D conversion without gain correction.
Figure 20:
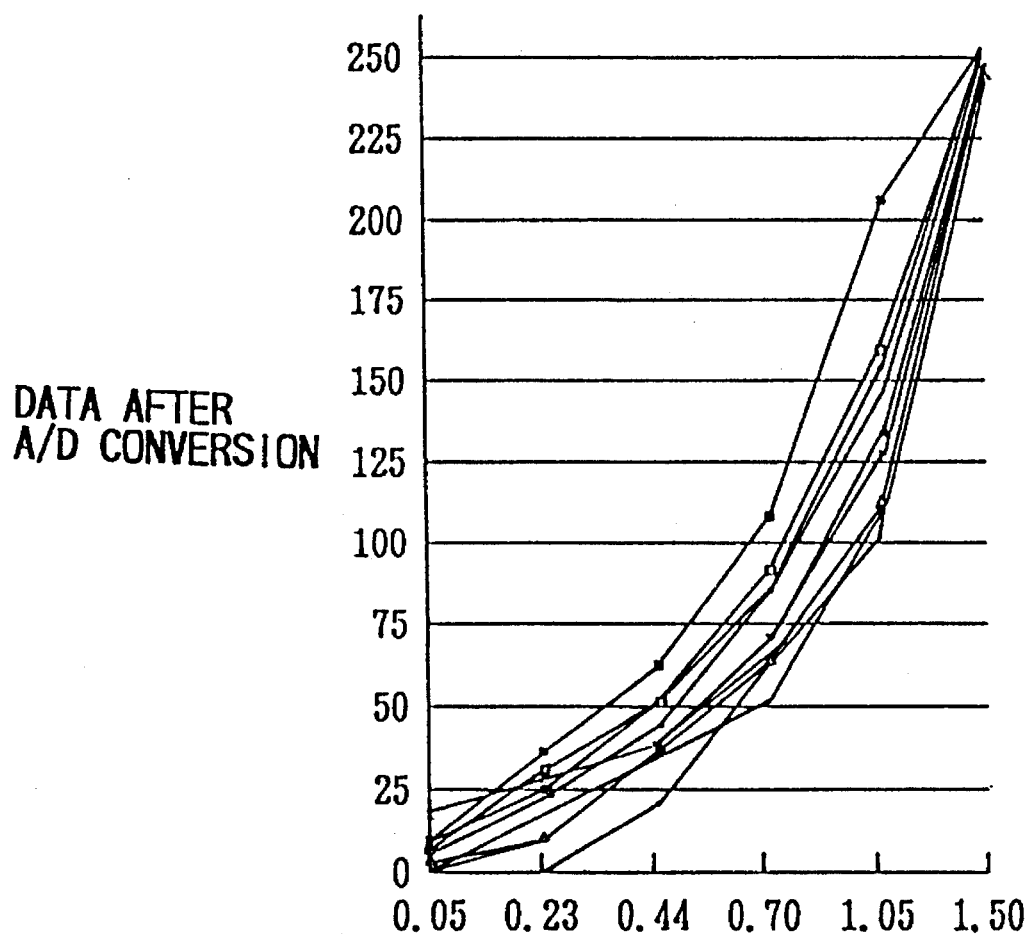
FIG. 20 is a graph showing a relation in a negative film between original density photographed and a data after A/D conversion with gain correction.

FIGS. 19 and 20 show data when a gain correction is made and a gain correction is not made wherein output value after A/D conversion against original density photographed on negative film is taken as parameter for an exposure condition (−3∼+6). As it is found from those data, even an exposure condition fairly widely ranges from −3 to +6, when a gain correction is made as shown in the FIG. 20, the difference cause by different exposure condition is fully corrected properly as compared with the case when a gain correction is not made as shown in the FIG. 19.

When there is not much change made in original density photographed, it may be considered that a view of low contrast has been photographed. Therefore, when such an image is read, if the aforementioned gain correction is uniformly conducted, there causes an extremely high contrast, and an output a photographer intended can not be displayed. Likewise, when a balance of R, G, and B is broken down like the scenery of sunset glow, if such a correction is uniformly conducted, an output a photographer aimed can not be displayed. Therefore, in the present embodiment, it is arranged a uniform gain correction is not conducted, and an adjustment is made by changing the contents of correction.

Films other than 35 mm film are mostly used by a specialist, and pictures are often taken under special exposure conditions in various situations. If, therefore, a correction is automatically made uniformly and is standardized, it may cause to miss an object of photographer. Further, positive film is used mostly by specialist. If, therefore, a correction is automatically made uniformly and is standardized, it may also cause to obstruct an object of photographer. It is, therefore, arranged in the present embodiment that the aforementioned automatic correction is not conducted.

FIG. 21 is a block diagram showing an image data processing based on the flow of an image data when the aforementioned correction is made. From a color CCD sensor 112, color separation signals R, G, and B are output wherein a transmission light emitted from a film 11 is separated into color components of R, G, and B. As a typical example, a description will be made on a color separation signal B. The color separation signal B is inputted into a video amplifier 401B which is provided with a function to amplify a signal and set an amplification ratio from the outside.

A setting of an amplifying ratio from the outside is freely conducted by inputting an output of D/A converter 402B connected to a data bus into the video amplifier 401B. Under a state that an amplification ratio is set at a predetermined value, a preliminary scanning prior to a scanning for image reading is performed, and MAX and MIN values of B component are extracted based on an image data of a predetermined number of picture elements which have been read. An amplification value to make a MAX value as a predetermined value at a video amplifier section 401B is set based on said MAX value. Through such a process, it becomes possible to correct the difference in B sensitivity caused by different kind of film and the difference caused by different exposure conditions. The same process is conducted for color separation signals R and G, and therefore, further description will be omitted.

A color separation signal B output from the video amplifier 401B is inputted into A/D converter 403B. In the A/D converter 402B, a process for changing an analogue signal to a digital signal is conducted, and at the same time, a shading correction process is executed for correcting irregularity in optical system and sensitivity in each dot of color CCD sensor 112.

In a shading correction process, a standard data preliminarily read is stored in a memory 404B provided for shading correction so that a correcting data is read synchronously with a timing an image data is taken in, and it becomes possible to input into a reference voltage input section of the A/D converter 403 through the D/A converter 405B. The same shading correction process is conducted on color separation signals R and G, and therefore, further description will be omitted.

The color separation signals R, G, and B thus changed to digital signals are input ted into positioning process section 406. In the positioning process section 406, a difference in position caused by the color CCD sensor 112 is corrected. In a compact color CCD sensor 112, generally 5,000 each of picture elements of R, G and B are disposed linearly at a predetermined space. A delaying process is, therefore, necessary for a positioning process in order to process signals of R, G, and B component of picture element at predetermined point.

Each output of color separation signals R, G, and B from the R/G/B positioning process section 406 is inputted into LUT407R, LUT407G and LUT407B respectively. Each of the LUT407R, LUT407G and LUT407B individually executes regularization process on each of the color separation signals R, G and B to be input ted. Though it is not shown in figure, each of the LUT407R, LUT407B and LUT407B are connected to a bus of CPU200 to make it possible to change a data electronically.

In each of the LUT407R0 LUT407B and LUT407B, a process for adjusting the contrast of an image is executed by fixing an amplitude of output data related to input data. In order to execute the process, the contents of each LUT407R, LUT407G and LUT407B are changed to obtain a predetermined width of output amplitude by using MIN value of each R, G, and B which has been read. With the process at the video amplifier 401R, 401G and 401B, and the process at LUT407R, LUT407G and LUT407B, a correcting process for the difference caused by a kind of film and the difference in exposure condition can be performed without a need of special memory.

Such correcting process are not conducted in the case of positive film. Even when negative film is used, when a balance of MAX value and MIN value of R, G, and B exceeds a predetermined range, it is electronically controlled not to execute a correcting process in the case of an image where there is no contrast (in the case when the difference between MAX value and MIN value is small). With such an arrangement, a special aim a specialist intended for a photograph can be accomplished without destroying features of the photograph taken when he has photographed a scenery in low contrast or a scenery wherein a balance of R, G, and B, is broken down.

An output from each of the LUT407R, LUT407G and LUT407B is inputted into a gamma correction, negative/positive reversion process section 408. In the gamma correction, negative/positive reversion process section 408, a data correcting process caused by different film 11, negative or positive, and a gamma correcting process, a data for inputting into a printer, to conform to a linear brightness data relative to reflection of original are conducted. Output signals R, G, and B, from the gamma correction, negative/positive reversion process section 408 are branched into a route of color CRT 2 system and a route of a printer section of digital color copying machine.

Description will be made first on an output route to a printer section.

An output from the gamma correction, negative/positive reversion process section 408 is inputted into a color adjustment/correction section 409. In the color adjustment/correction section 409, a feedback for a color adjustment process by utilizing the color CRT 2, and a correction process for conforming an output image data of a film reading device to an image data on the side of a digital color copying machine are conducted.

Output signals R, G, and B from the color adjustment/correction section 409 are inputted into a variable magnification and movement process section 410. The variable magnification and movement process section 410 executes variable magnification and movement process in the main scanning direction of an image data.

Description will then be made on a route to the color CRT 2.

Each of output signals R, G, and B from the gamma correction, negative/positive reversion section 408 is inputted into respective memory 411R, 411G and 411B. Each memory 411R, 411G and 411B is provided for storing image signals R, G, and B which have been read to indicate them on the color CRT 2. The contents of memory can be read from the CPU 200, and they are also utilized when a data is extracted from the aforementioned preliminary scanning.

Output signals R, G, and B from the memories 411R, 411G and 411B are inputted into the color adjustment/correction section 412 for display on the color CRT 2, and a color adjustment feedback by use of the color CRT 2 and a correcting process for conforming film reading data to a data of color CRT 2 are conducted.

Output signals R, G, and B from the color adjustment/correction section 412 are inputted into a plane mix section 413, and a process for composing a data from a character plane memory 414 which is separately provided from an image data memory and an image data are conducted. Output signals R, G, and B from the plane mix section 413 are output to the color CRT 2 as analog R, G, B signals through a D/A converter 415.

Description will be made hereinafter on an action of the color image reading apparatus of the present embodiment referring to accompanying flowcharts shown in FIG. 22 and the following figures.

Figure 22:
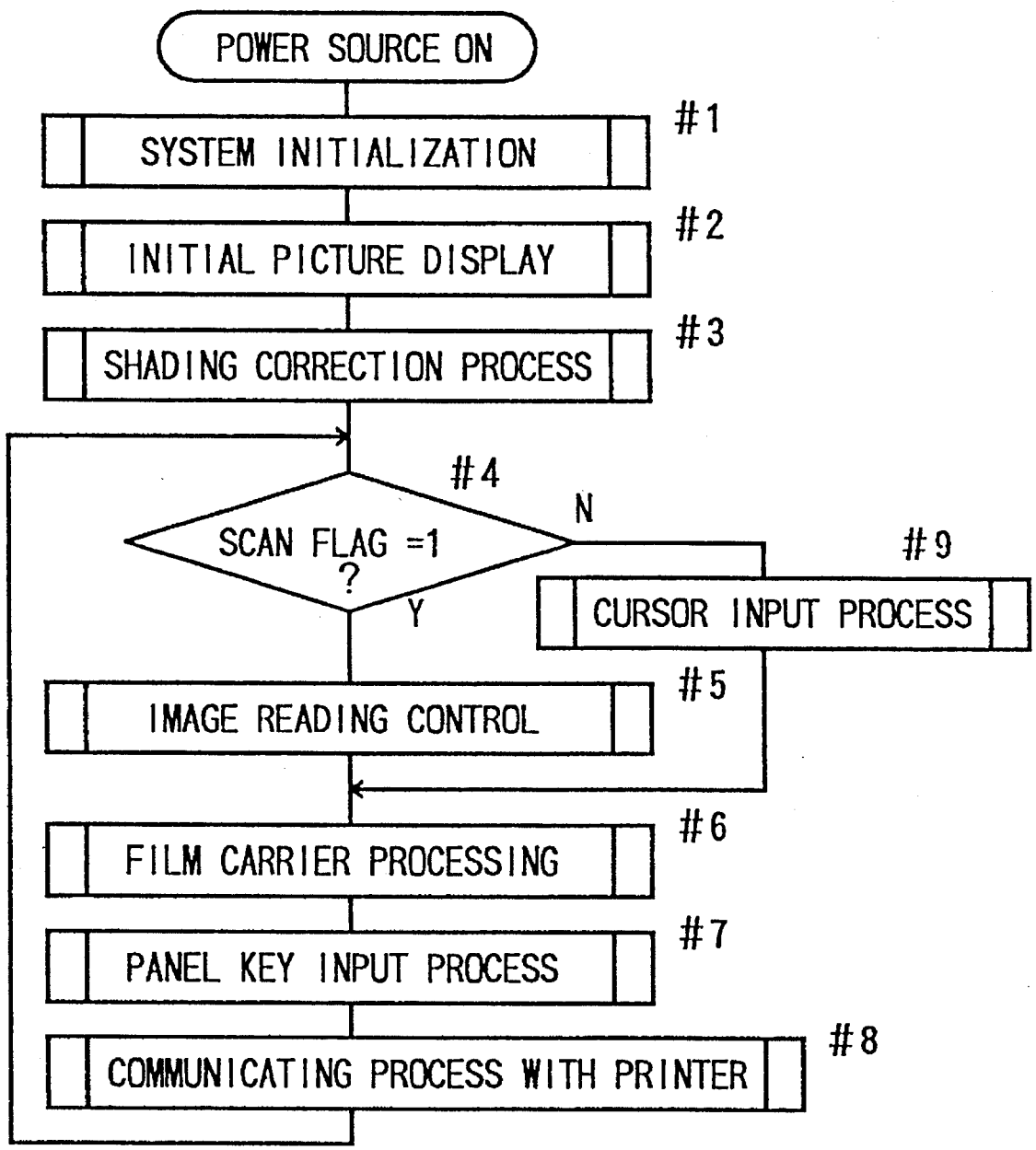
FIG. 22 is a flowchart of subroutine showing the main control of CPU.

FIG. 22 shows a main program of control by CPU200. Upon turning on a power source, a program is started, and RAM of CPU200 and resetting of peripheral devices are initialized (step #1). An initial picture for setting a copy mode in a color CRT 2 is then displayed (step #2), and a shading correction is conducted for initializing the color CCD sensor 112 provided for image reading (step #3). A preparation for an image reading operation completes with said process.

Thereafter, a judgment is made whether an image reading operation is being conducted or not from a state whether scan flag is 1 or not (step #4). If the scan flag is 1, which means an image reading operation is being conducted, program proceeds to step #5 for a sub-scanning control and control related to an image reading operation. When an image operation is not being conducted at step #4, program moves to step #9, and by performing a cursor input process corresponding to an image display by the color CRT 2, a setting of copying mode and a setting of trimming area are conducted.

After either one of the process is conducted, program proceeds to step #6 to detect the state of a film carrier, and a film carrier process is conducted to control each element. At the following step #7, a panel key input process is executed corresponding to a key operation on an operation panel 72. At step #8, a key operation on the operation panel 72, a result of a copy mode setting on a picture of the color CRT 2 and a state of copying operation are transmitted through a communication process with the printer according to a requirement. With said process, a film image can be printed out by transferring an image read by a film scanner to the printer.

Figure 23:
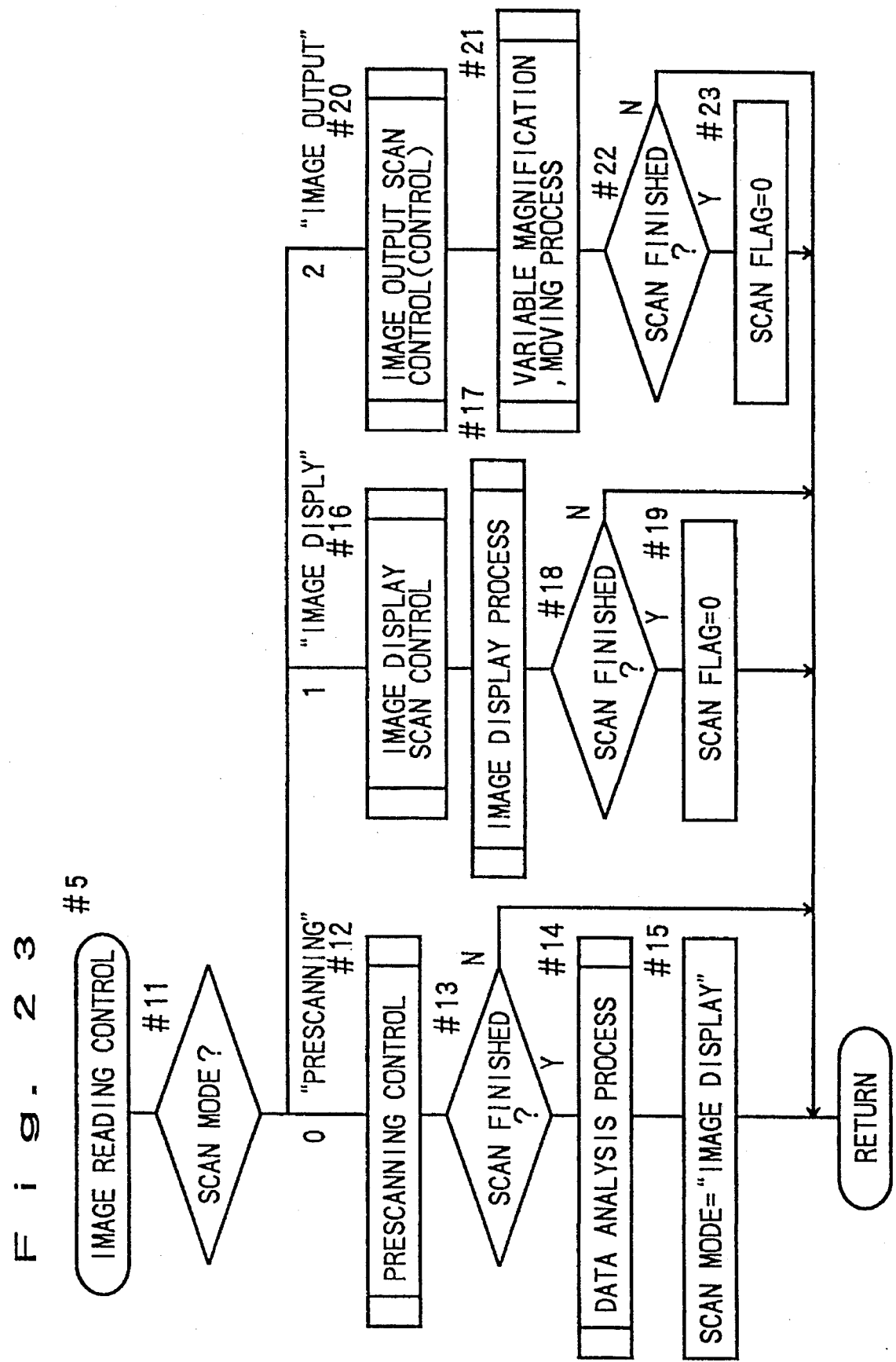
FIG. 23 is a flowchart of image reading control subroutine.

FIG. 23 shows an image reading control subroutine at step #5 in the FIG. 22. In an image reading control, each scan mode indicated by operation keys on the operation panel 72 is controlled. At step #11, a scan mode is identified. If it is a prescanning mode, program proceeds to step #12, while if it is an image display mode, the program moves to step #16. In the case of an image output mode, program proceeds to step #20.

Description will now be made on a "prescanning mode". In the prescanning mode, the entire image of a film is read, and a prescanning control for storing a film image data into an image input memory is conducted (step #12). After completion of the scan control (step #13), a data analysis process is conducted for analyzing the stored film image data (step #14). The scan mode is changed to an "image display mode" (step #15) to finish a process. In other words, a reading condition is changed corresponding to a result of image data analysis preliminarily scanned and read to perform an image display.

Description will then be made on an "image display mode". In the image display mode, the entire film image is read (step #16) based on a reading condition decided by a result of data analysis to display the film image on the color CRT 2 by an image display process at step #17.

A scanning process for displaying the image at step #16 is conducted through process of regularization of R, G, and B data read by the color sensor 112, and reversion of negative and positive. One scanning process will be enough since it is intended to perform a display on the color CRT 2. After the scanning process is finished (step #18), a scan flag is set to 0 which indicates a finish of image reading, and the processing is completed (step #19).

Description will be made on an "image output mode". In the image output mode, a film image is read based on 'image reading start position', 'image reading finish position', 'scan mode', and 'the number of scanning process' under a copy mode set on the picture of the color CRT 2 (step #20) to process a variable magnification and movement of the image in a main scanning direction with process of variable magnification and movement at step #21.

In an image output scan control at step #20, data of R, G, and B read by the color CCD sensor 112 are transmitted to the printer section. Since a conversion process is conducted from R, G, and B to color signals Y (yellow), M (Magenta), C (cyan) and K (black) for reproducing an image read, the number of scanning process is four times the number of sheets to be used for output. After a scan is finished (step #22), a scan flag is set to 0 which shows a finish of an image reading to complete the process. With said process, a film scanner and image processing are controlled on each scan mode thereby enabling an image display on the color CRT 2 and an image output to the printer section.

Figure 24:
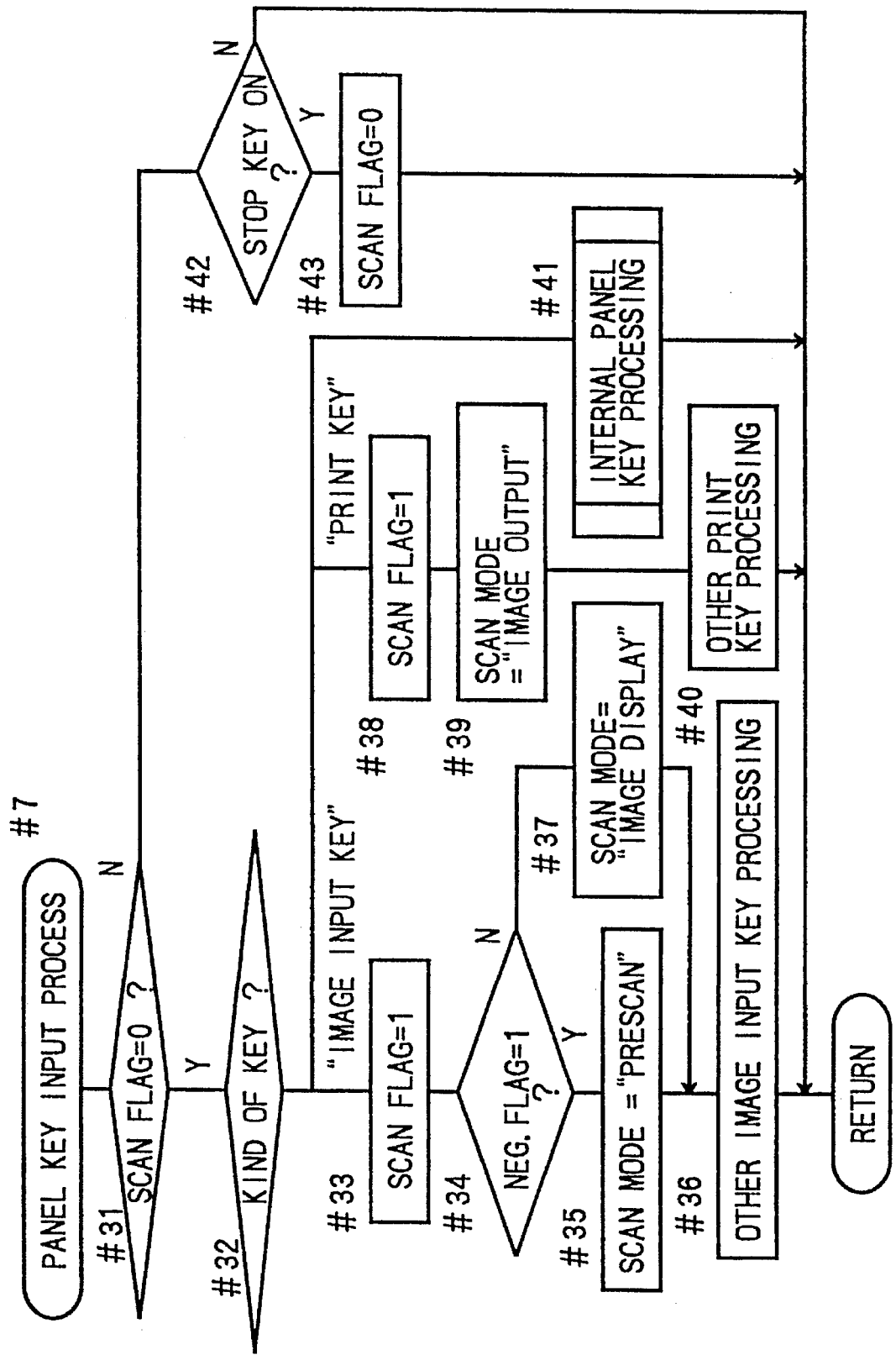
FIG. 24 is a flowchart of panel key input processing subroutine.

FIG. 24 shows a subroutine of a panel key input process at step #7 in the FIG. 22. In the panel key input process, a process is performed corresponding to a key operation on the operation panel 72 and internal panel 73. A scan flag is first checked (step #31), and if the scan flag is not 0, i.e. a copying operation is being conducted or a scanning is being conducted for an image display, a judgment is made whether a stop key is pressed or not (step #42). When the stop key is pressed, a scan flag is set to 0 to finish an image reading (step #43). If the scan flag is 0 at step #31, program proceeds to step #32 to conduct a process corresponding to a kind of key.

Description will be made on the case when "an image input key" is operated. When the image input key is operated, program proceeds to step #33, and a scan flag for designating an image reading is set to 1. Then, a judgment is made whether a film which is set is negative or positive according to a condition of a negative flag (step #34). If a negative flag is 1, which means a negative film, a scan mode is set to "prescanninh mode" (step #35) for changing a reading condition by a film image data. If the negative flag is 0, which means a positive film, a scan mode is set to "an image display mode" in order to directly conduct an image display without conducting prescanning (step #37 ). Other image input key processing such as a message display on an image are further conducted (step #36).

Description will now be made on the case when "a print key" is operated. When the print key is operated, program proceeds to step #38, and a scan flag for designating an image reading is set to 1. Then, a scan mode is set to "image output mode" for outputting R, G, B signals of an image to a printer (step #39). Other print key processing such as a message display on the picture of the color CRT 2 are further conducted (step #40).

Description will further be made on the case when "internal panel 73" is operated. When an internal panel key is pressed, program proceeds to step #41, and a key process corresponding to each key is conducted. With said process, process corresponding to keys on the operation panel 72 and internal panel 73 are performed thereby enabling an image reading and image output process. When a stop key is operated, the program is returned as it is.

Figure 25:
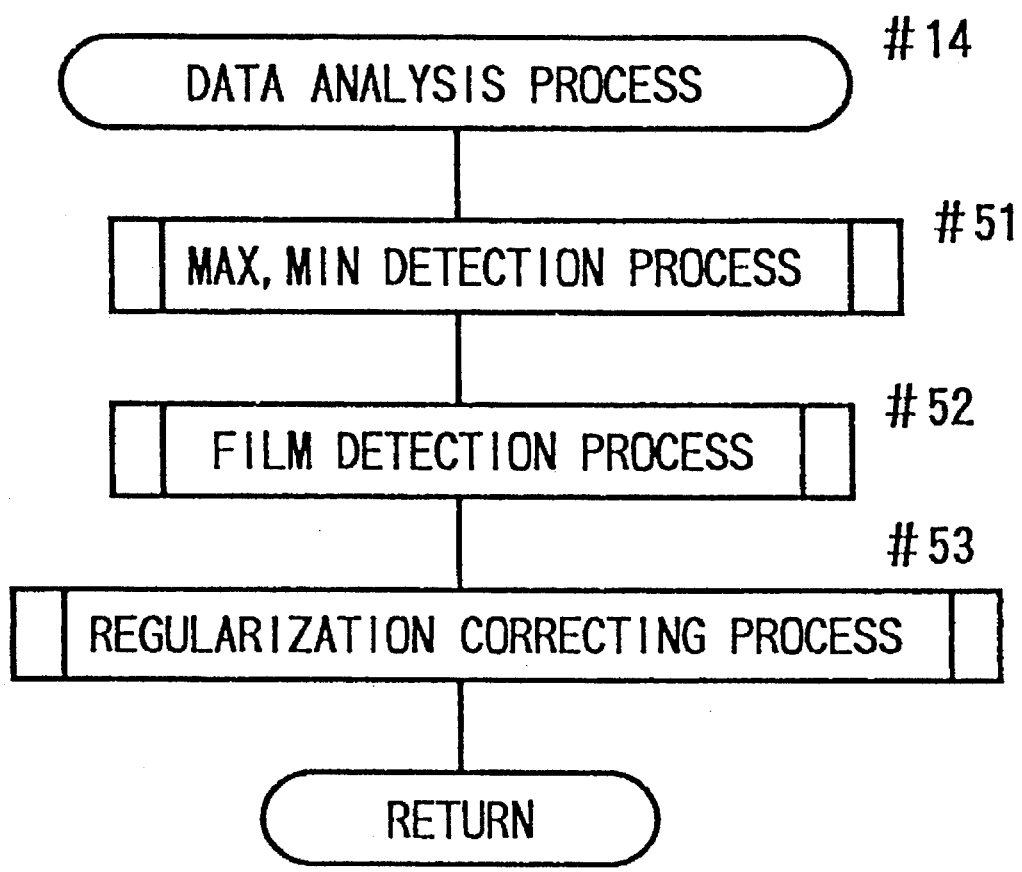
FIG. 25 is a flowchart of data analysis processing subroutine.

FIG. 25 shows a subroutine of a data analysis processing at step #14 in the FIG. 23. Various data analysis is processed hereat for the data stored in image memory. In a subroutine at step #51, MAX and MIN values are detected from a data of one picture taken in. In a subroutine at step #52, a detection is made whether a film is provided or not from an image data read. Further, in a subroutine at step #53, a correction process is conducted for regularizing a data of an image which has been read.

Figure 26:
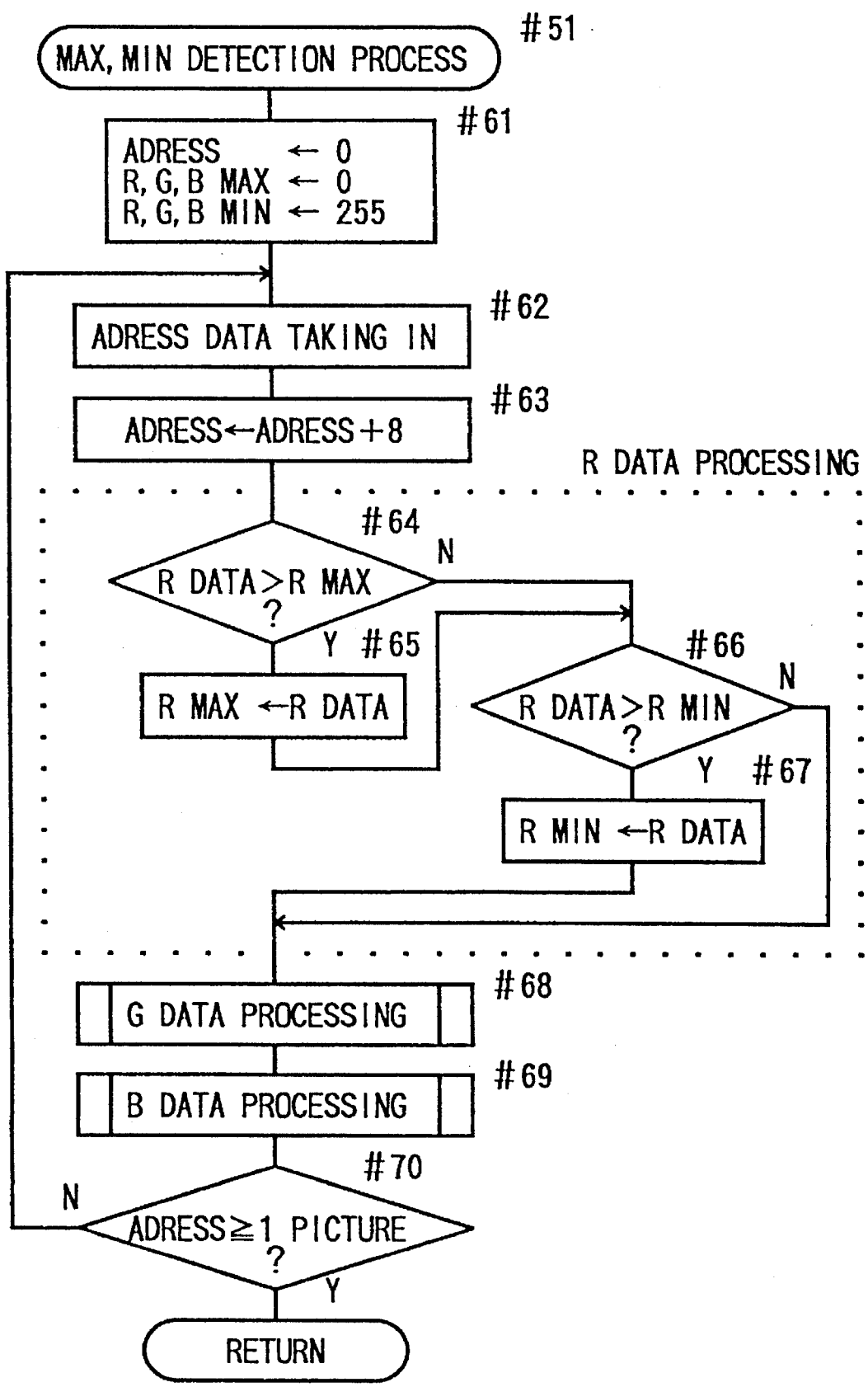
FIG. 26 is a flowchart of MAX value, MIN value detection processing subroutine.

FIG. 26 shows a subroutine of MAX and MIN value detection process at step #51 in the FIG. 25. Initial values are firstly set at step #61. For MAX value of each R, G, and B, minimum value in a data are inputted, and for MIN value of each R, G, and B, maximum value in a data are inputted respectively. Then, a process for taking in a predetermined address is conducted (step #62), and at the same time, a count up process for reading out the address is performed (step #63). In the present embodiment, the number of data samplings are set at one eighth of all picture elements.

A comparison process is firstly performed between an R data and MAX value of the present R (step #64). If the R data is larger than the MAX value of R, program proceeds to step #65 where the MAX value of R is renewed to the data value, and advances to step #66. If it is not larger than the MAX value of R, the program moves to step #66 as it is. At step #66, comparison is made between an R data and a MIN value of R. If the R data is smaller than the MIN value of R, the program moves to step #67, and the MIN value of R is renewed as an R data before moving to step #68. If the R data is not smaller than the MIN value of R, the program proceeds to step #68 as it is. In a subroutine at step #68, the same process as the R data is conducted for G data, and in a subroutine at step #69, the same process as the R data is conducted for B data respectively. At step #70, a judgment is made whether a sampling for one picture is finished or not from an address value. When it has not been finished yet, the program returns to step #62 to repeat said processing. If it has been finished, this routine is completed.

Figure 27:
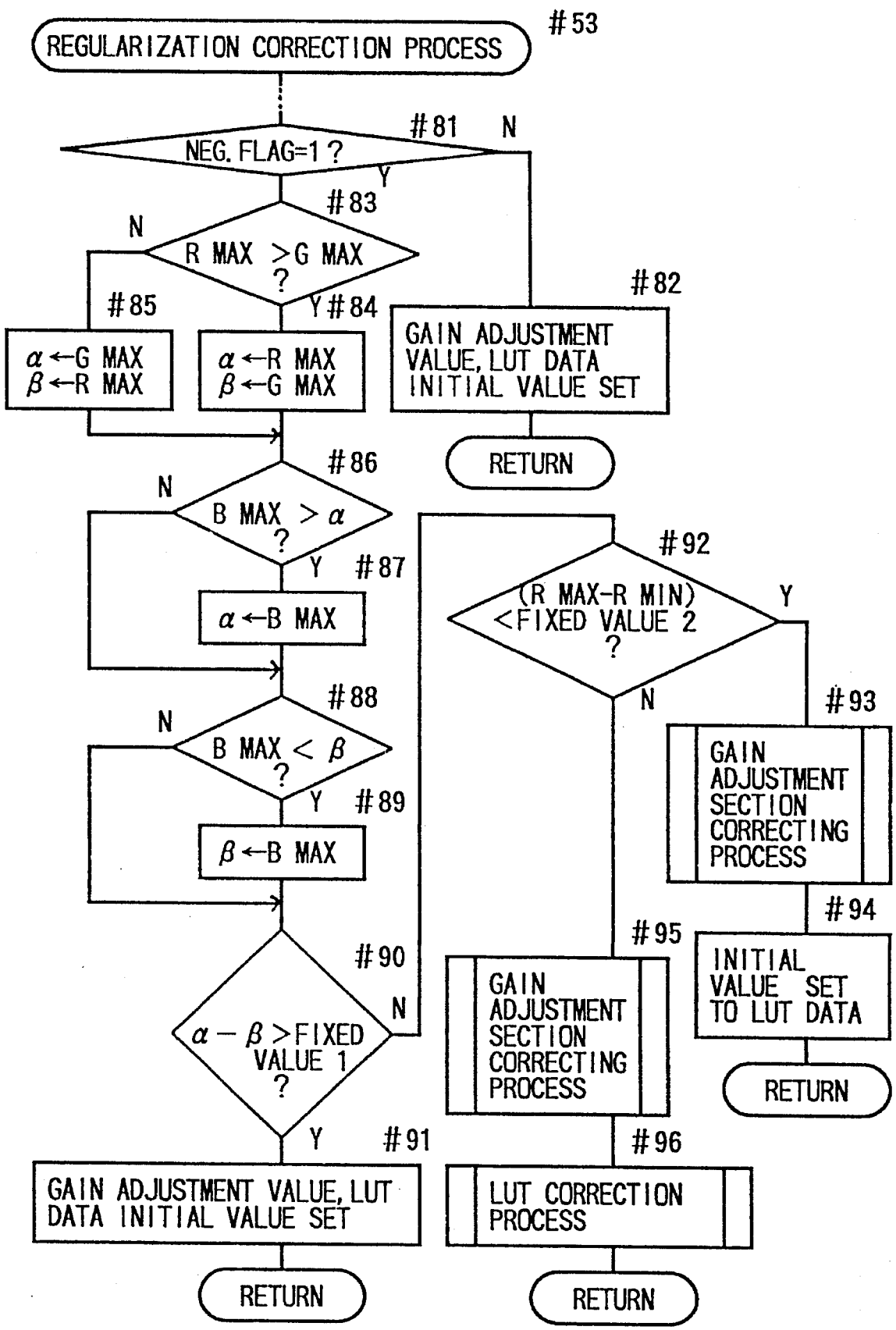
FIG. 27 is a flowchart of regularization correction processing subroutine.

FIG. 27 shows a subroutine of regularization correction process at step #53 in the FIG. 25. At step #81, a negative flag is firstly checked whether it is set to 1 or not. If it is not 1, program moves to step #82, and initial value is set to a gain adjustment value and LUT data. When the negative flag is set to 1, the program proceeds to step #83. In the process from step #83 to step #90, R, G, and B are balanced by guiding the maximum and minimum values from each of MAX value extracted from R, G, and B data which have been read, and depending on whether the difference exceeds a predetermined value, a judgment is made whether correction process is to be executed or not even in the case of negative film. If the difference exceeds a predetermined value, the correction process is not performed.

At step #83, a relation in value between MAX value of R and MAX value of G is first judged. When a MAX value of R is larger, the program moves to step #84 and substitute the MAX value of R for α, and substitute the MAX value of G for β respectively. If the MAX value of G is larger, the program proceeds to step #85 and substitute the MAX value of G for α, and substitute the MAX value of R for β respectively.

Then, at step #86, a relation in value between MAX value of B and a value of α is judged. When the MAX value of B is larger, the program moves to step #87 and substitute the MAX value of B for α. The maximum of each MAX value of R, G, and B are stored for α hereat. After this process has been finished or when a value of α is larger at step #86, the program moves to step #88.

At step #88, a relation in value between MAX value of B and a value of β is judged. When the MAX value of B is smaller, program proceeds to step #89 and substitute the MAX value of B for β. The minimum of each MAX value of R, G, and B are stored for β hereat. After this process has been finished or when a value of β is smaller at step #88, the program moves to step #90 as it is, and a judgment is made whether the difference between a value of α and a value of α is larger than a predetermined value 1 or not. In other words, a judgment is made whether the difference between the maximum and minimum in each MAX value of R, G, and B exceeds a predetermined value 1. When the difference exceeds a predetermined value 1, the program moves to step #91 to set an initial value to a gain adjustment value and LUT data, and the present subroutine is completed.

In the present embodiment, a judgment is made at a MAX value, however, similar processing may also be performed by utilizing an average value, MIN value and the like.

When the difference does not exceeds a predetermined value, the program moves to step #92 wherein a judgment is made whether or not the difference between MAX and MIN value of R is lower than a predetermined value 2, i.e. whether or not the amplitude of a data which has been read is lower than a predetermined value 2. This is because if an LUT correction process is executed when amplitude of an original data is small, it causes an extreme contrast with incompatible output. Therefore, it is arranged not to execute such an LUT correction process. Correcting process at a gain adjustment section is, however, executed since there is no problem.

In the case when said amplitude is lower than a predetermined value 2, the program moves to step #93 to execute subroutine for a gain adjustment section correcting process, and then, an initial value is set to an LUT data (step #94) to complete the present subroutine. In the case if the amplitude exceeds a predetermined value 2, a subroutine for a gain adjustment section correcting process is executed at step #95, and then, a subroutine for an LUT correction process is executed at step #96 to complete the present subroutine. A method of judgment at step #92 is not limited to the method of judgment stated in the present embodiment. Other similar method may also be employed.

Figure 28:
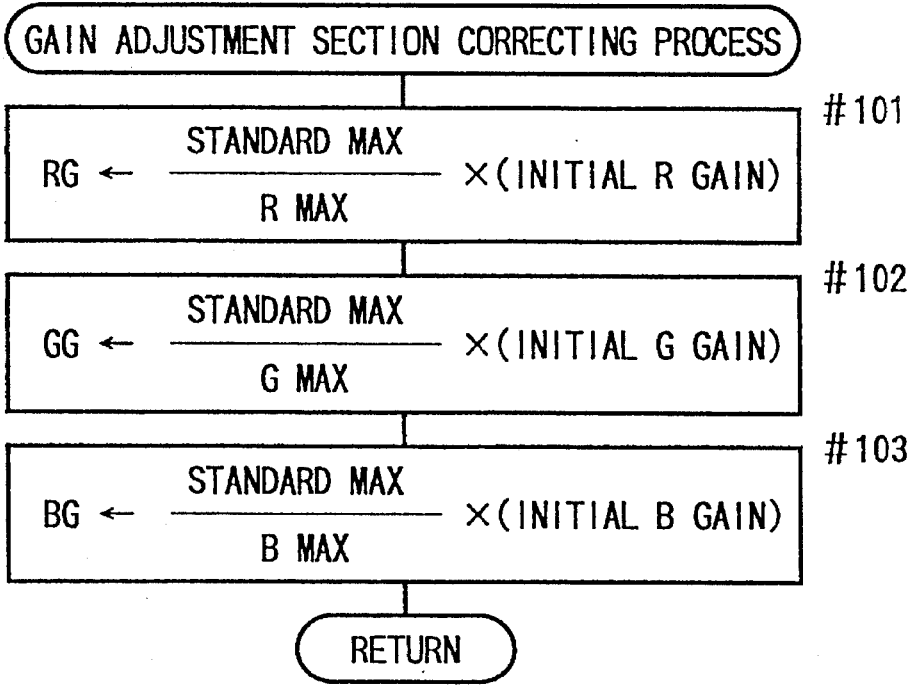
FIG. 28 is a flowchart of gain adjustment section correcting process subroutine.

FIG. 28 shows a subroutine for the gain adjustment section correcting process at step #95 in the FIG. 27. Description will now be made by exemplifying an R signal. At an initial adjustment, a gain adjustment is made so as to make a "standard MAX value" with an adjustment by a standard film. A gain on an R line at this time is called an "initial R gain". A MAX value of R extracted from a data which has been read is a value obtained from said "initial R gain". In this process, a gain is corrected so as to make a MAX value of R as a standard MAX value. In other words, it is necessary to correct the gain from the "initial R gain" to a ratio of (Standard MAX value/MAX value of R). Therefore, at step #101, if a gain after correction is designated as RG, (standard MAX value/MAX value of R) x (initial R gain) is given to the RG. The G and B signals are also processed with the same idea as stated above (step #102, #103).

Figure 29:
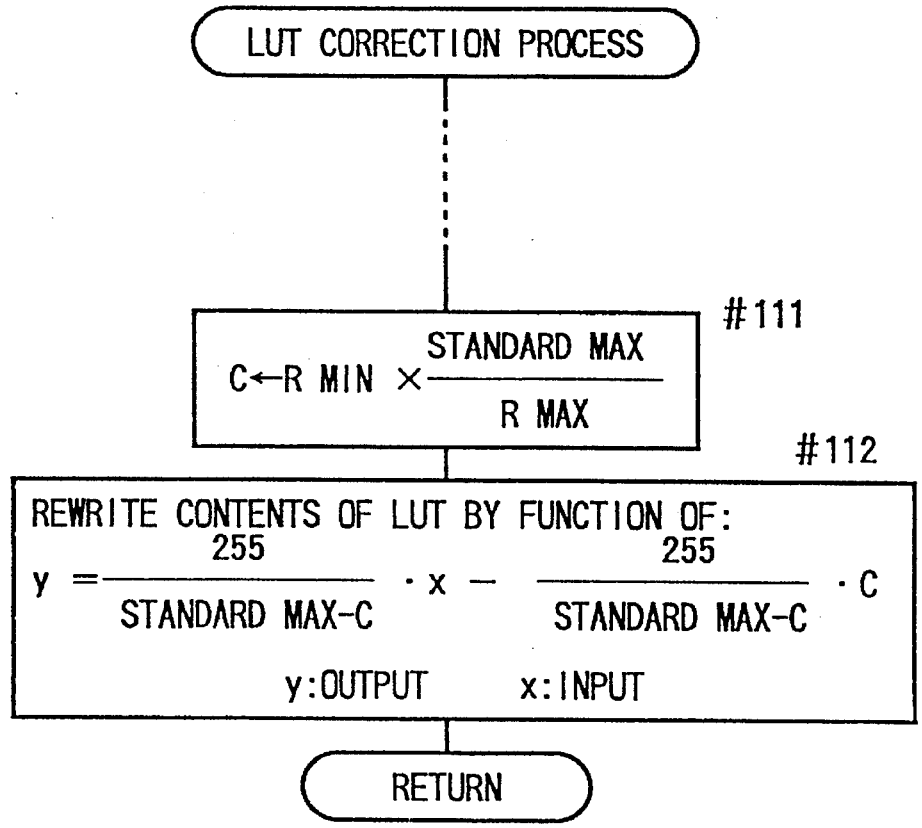
FIG. 29 is a flowchart of LUT correction processing surboutine.
Figure 30:
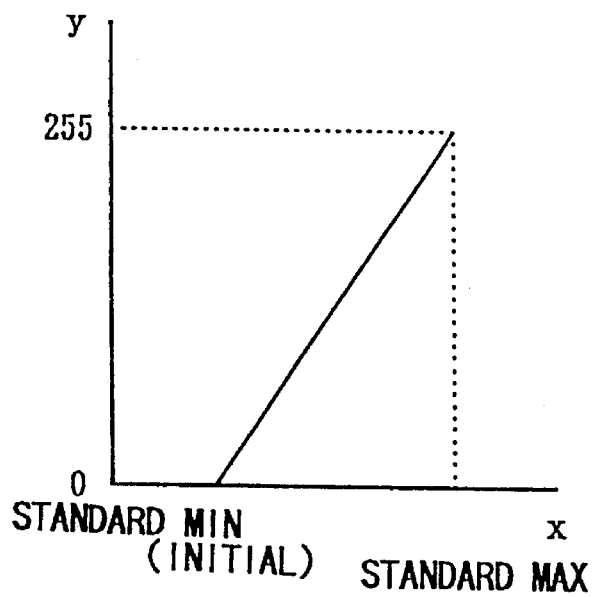
FIG. 30 is a graph showing initial data characteristic for use in LUT correction processing.

FIG. 29 shows a subroutine for the LUT correcting process at step #96 in the FIG. 27. Description will be made by exemplifying an R signal. In an initial LUT, a characteristic initial data shown in FIG. 30 is stored. A mark x represents an input value (address value), and y an output value (data value) respectively. Since an output is amplified by a gain adjustment correction by (standard MAX value/MAX value of R), MIN value data of R extracted at the time of reading naturally becomes a value of (MIN value of R) x (standard MAX value/MAX value of R).

Therefore, at step #111, said value of (MIN value of R) x (standard MAX value/MAX value of R) is calculated and substituted for C. Then, at step #112, the contents of LUT is rewritten with the following function.

$$y = \frac{255}{\text{Standard } MAX - C} \cdot x - \frac{255}{\text{Standard } MAX - C} C$$

Figure 31:
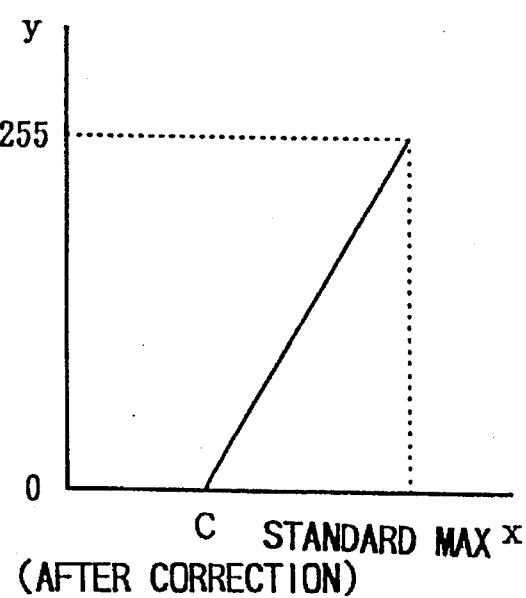
FIG. 31 is a graph showing characteristic of data after correction process by LUT correction processing.

FIG. 31 shows a data characteristic of LUT which has been rewritten after correction.

In FIG. 29, R signal only is shown, however, the same process is performed on G and B signal lines, and the subroutine is completed. With the aforementioned processing, MAX value of image data on R, G, and B are gathered, and at the same time, they are balanced, and the width of image data of R, G, and B are matched so that by correcting the irregularity caused by different exposure conditions and kind of film, the features of scenery and an intention of a specialist can be maintained without having any damage.

FIG. 32 shows a subroutine of the film carrier processing at step #6 in the FIG. 22. In the subroutine, a judgment is made whether an initialization is made for negative or positive from the state of lamp unit 41 and film carrier 3. At step #121, an identification of the size of a lamp unit is executed, and the following process is divided by a result of the identification.

At step #121, in the case when it is judged that a lamp unit 41 is for a 35 mm film, a kind of film carrier 3 being set is judged at step #122, and if it is judged that the carrier is for a continuous film, the program moves to step #123 to judge whether a rewriting for default is performed or not. If it is judged that there is no rewriting made for default, the program proceeds to step #131, and a process for setting a negative state is performed, i.e. to process a negative flag to set to 1, and the present subroutine is completed.

At step #123, if it is judged that there is a rewriting made for default, a judgment is made whether negative or not. In the case of negative, the program moves to step #131 to process for negative state setting. If it is not negative, the program proceeds to step #132 to process a positive state setting, i.e. to process a negative flag to set to 0, and after either one of the process is finished, the present subroutine is completed. At step #122, if it is judged that a film carrier 3 being set is for a mounted film, the program moves to step #125, and a judgment is made whether there is a rewriting for default or not. When it is judged that there is no rewriting for default, the program moves to step #132 as it is to process a positive state setting, and the subroutine is completed. At step #125, if it is judged that there is a rewriting for default, the program proceeds to step #126 to judge whether negative or not, and in the case of negative, the program proceeds to step #131 to process a positive state setting. After either one of the process is executed, the subroutine is completed.

At step #121, when a lamp unit 41 being set is for 6 cm film, the program moves to step #127 to judge whether there was a rewriting for default or not. When there was no rewriting for default, the program proceeds to step #132 to process a positive state setting, and the subroutine is completed. If there is a rewriting for default, the program moves to step #128 to judge whether negative or not. In the case of negative, the program proceeds to step #131 to process a negative state setting, and if it is judged that the state is not negative, the program proceeds to step #132 to process a positive state setting. After either one of the process is executed, the subroutine is completed.

At step #121, when a lamp unit being set is for a 4×5-inch film, the program moves to step #129 to judge whether there was a rewriting for default. If there was no rewriting, the program proceeds to step #132 as it is to process a positive state setting, and the subroutine is completed. If there was a rewriting for default, the program moves to step #130 to judge whether negative or not. In the case of negative, the program proceeds to step #131 to process a negative state setting. If it is not negative state, the program moves to step #132 to process a positive state setting, and after either one of the process is executed, the subroutine is completed.

According to the aforementioned embodiment, an image reading process is preliminarily performed when a color image is read by imaging means. From a data on each color separation signal of three colors on a predetermined number of picture elements at this stage, those predetermined characteristic values, i.e. characteristic values related to a kind of film, are extracted from characteristic value extracting mean, and based on the extracted data, an image data on each color separation signal of three colors are corrected by correcting means. Accordingly, an image reading data can automatically be corrected corresponding to the difference in a kind of film and exposure condition without the need of special storing means nor special input means for storing standard value. As a result, the construction of the apparatus can be simplified to facilitate easy handling, and manufacturing cost is eventually reduced substantially.

Control means controls said correcting means whether the correcting means is to be operated or not operated corresponding to a judgment made by judging means depending on whether a data distribution on a characteristic value is within a predetermined range or not. A special aim of specialist who is handling color image can, therefore, be attained without having hindrance to damage characteristics of an image which possesses a weak contrast, and a proper output can be obtained by matching a real condition without any special input operation and mechanism required for it.

The contents of correction made by said correcting means is changed by changing means corresponding to said extracted characteristic value, so that a correction can be properly processed corresponding to the difference in the state of an image which has been read. Since the correction is made uniformly, the characteristics of an image is prevented from any hindrance to damage the characteristics of the image without any special input operation and mechanism required for it. An image data is automatically corrected only when it is required to do so, and the quality of image can be improved.

The maximum and minimum values are set in said characteristic value, so that the density of an image which has been read can be easily judged accurately on whether the density is excessive or insufficient, and whether the contrast is weak or not. Only a gain correction based on the maximum value, and the contents of correction based on a gain correction based on the maximum value and output range correction based on the minimum value can be properly changed. Since a correction is made uniformly even under the aforementioned special condition, an image reading data can be properly corrected by avoiding a problem of having extreme contrast.

A balance in a characteristic value on each color separation signal of three colors is judged by judging means whether the balance is within a predetermined range or not, and the balance of image data on each color separation signal of three colors is controlled by controlling an action of the correcting means whether the correcting means is be operated or not corresponding to the result of the judgment. Accordingly, when the balance of R, G, and B is ill balanced like the scenery of sunset glow, the aforementioned balance correction is performed for a photographer to display his desired output, and a color balance of image reading data is properly corrected to further improve the quality of image.

Further, a judgment is made on the matters whether a color image is for positive film or not, and what is the size of a film by judging means, and based on an action of the control means corresponding to the judgment, the correcting means is controlled whether it is to be operated or not. Therefore, when a specialist uses a film of his choice for size and kind, it can be arranged not to perform said correction without resorting to any special operation. Any obstacle to hinder the aim of a specialist can be avoided by performing an automatic and uniform correction when the specialist uses a film he has chosen. Moreover, when the correcting means is not operated, the preliminary process is not performed wastefully so that work efficiency can be improved.

When a uniform correction is not desired on an image of film a specialist photographed, it is only required to designate a kind and size of a film even if there are differences in the kind and size of the film.

As shown by a phantom line in the FIG. 9, a key 600 is provided on the operation panel 72 for inputting a data that an image is photographed by a specialist, and by only operating the key 600, or in cooperation with said automatic corresponding function, a uniform correction can be avoided to simplify the way of operation and mechanism of the apparatus. By providing said key 600, it can also be applied to other cases when similar process is required, Although, the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus for reading a color image on each picture element, comprising:

a reader which reads the color image and outputs image data corresponding to each of three primary colors on each picture element;

a detector which detects whether the color image is a positive print or not;

correcting means for correcting a look-up table data and a gain adjustment value which corrects the image data output from the reader for each of the three primary colors, wherein correction by said correcting means is different among the three primary colors; and a controller which controls that both of the look-up table data and the gain adjustment value are set to an initial value, or corrected to data or value based on the image data output from the reader, in response to the detection of the detector.

2. An image reading apparatus for reading a color image formed on a film on each picture element, comprising:

a reader which reads the color image and outputs image data corresponding to each of three primary colors on each picture element;

a detector which detects the size of the film on which the color image is formed;

correcting means for correcting a look-up table data and a gain adjustment value which corrects the image data output from the reader for each of the three primary colors, wherein correction by said correcting means is different among the three primary colors; and a controller which controls that both of the look-up table data and the gain adjustment value are set to an initial value, or corrected to data or value based on the image data output from the reader, in response to the detection of the detector.

3. An image reading apparatus for reading a color image on each picture element, comprising:

a reader which reads the color image and outputs image data corresponding to each of three primary colors on each picture element;

a detector which detects a condition of a contrast of the color image based on the image data output from the reader;

a look-up table which corrects the image data output from the reader for each of the three primary colors, wherein correction by said look-up table is different among the three primary colors; and a controller which controls that look-up table data is set to an initial value or corrected to a value based on the image data output from the reader, in response to the condition of the contrast.

4. The image reading apparatus as claimed in claim 3, wherein said detector extracts maximum image data and minimum image data of a predetermined color based on the image data output from the reader in order to detect the condition of the contrast of the color image.

5. The image reading apparatus as claimed in claim 4, wherein said controller controls that the look-up table data is set to an initial value when the difference between said maximum image data and said minimum image data is smaller than a predetermined value, and the look-up table data is corrected to a value based on the image data output from the reader when the difference between said maximum image data and said minimum image data is larger than the predetermined value or equal to the predetermined value.

6. An image reading apparatus for reading a color image on each picture element, comprising:

a reader which reads the color image and outputs image data corresponding to each of three primary colors on each picture element;

a detector which detects a condition of a color balance of the color image based on the image data output from the reader;

a gain adjustment section which corrects the image data output from the reader for each of the three primary colors, wherein correction by said gain adjustment section is different among the three primary colors; and a controller which controls that a value of the gain adjustment section is set to an initial value or corrected to a value based on the image data output from the reader, in response to the condition of the color balance.

7. The image reading apparatus as claimed in claim 6, wherein said detector extracts maximum image data on each color of the three primary colors based on the image data output from the reader in order to detect the condition of the color balance of the color image.

8. The image reading apparatus as claimed in claim 7, wherein said controller controls that the value of the gain adjustment section is set to an initial value when the difference between a maximum value of said maximum image data and a minimum value of said maximum image data is larger than a predetermined value, and the value of the gain adjustment section is corrected to a value based on the image data output from the reader when the difference between the maximum value of said maximum image data and the minimum value of said maximum image data is smaller than the predetermined value or equal to the predetermined value.

9. An image reading apparatus for reading a color image on each picture element, comprising:

a reader which reads the color image and outputs image data corresponding to each of three primary colors on each picture element;

a first detector which detects a condition of a contrast of the color image based on the image data output from the reader;

a second detector which detects a condition of a color balance of the color image based on the image data output from the reader;

a look-up table which corrects the image data output from the reader for each of the three primary colors;

a gain adjustment section which corrects the image data output from the reader for each of the three primary colors;

a first controller which controls that look-up table data is set to an initial value or corrected to a value based on the image data output from the reader, in response to the condition of the contrast detected by said first detector; and a second controller which controls that a value of the gain adjustment section is set to an initial value or corrected to a value based on the image data output from the reader, in response to the condition of the color balance detected by said second detector.

10. The image reading apparatus as claimed in claim 9, wherein said first detector extracts maximum image data and minimum image data of a predetermined color based on the image data output from the reader in order to detect the condition of the contrast of the color image.

11. The image reading apparatus as claimed in claim 10, wherein said first controller controls that look-up table data is set to an initial value when the difference between said maximum image data and said minimum image data is smaller than a predetermined value, and the look-up table data is corrected to a value based on the image data output from the reader when the difference between said maximum image data and said minimum image data is larger than the predetermined value or equal to the predetermined value.

12. The image reading apparatus as claimed in claim 9, wherein said second detector extracts maximum image data on each color of the three primary colors based on the image data output from the reader in order to detect the condition of the color balance of the color image.

13. The image reading apparatus as claimed in claim 12, wherein said second controller controls that the value of the gain adjustment section is set to an initial value when the difference between a maximum value of said maximum image data and a minimum value of said maximum image data is larger than a predetermined value, and the value of the gain adjustment section is corrected to a value based on the image data output from the reader when the difference between the maximum value of said maximum image data and the minimum value of said maximum image data is smaller than the predetermined value or equal to the predetermined value.

* * * * *